United States Patent
Suzuki et al.

(10) Patent No.: US 9,843,715 B2
(45) Date of Patent: Dec. 12, 2017

(54) PHOTOGRAPHIC APPARATUS, STROBOSCOPIC IMAGE PREDICTION METHOD, AND A NON-TRANSITORY COMPUTER READABLE STORAGE MEDIUM STORING STROBOSCOPIC IMAGE PREDICTION PROGRAM

(71) Applicant: OLYMPUS CORPORATION, Hachioji-shi, Tokyo (JP)

(72) Inventors: Takayuki Suzuki, Hachioji (JP); Manabu Ichikawa, Hachioji (JP); Shinichiro Ishikane, Tokyo (JP); Tsutomu Kuroki, Kodaira (JP); Yasutaka Sawa, Fuchu (JP); Ayako Tsunefuji, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 355 days.

(21) Appl. No.: 14/614,925

(22) Filed: Feb. 5, 2015

(65) Prior Publication Data
US 2015/0237243 A1 Aug. 20, 2015

(30) Foreign Application Priority Data
Feb. 17, 2014 (JP) .................................. 2014-027745

(51) Int. Cl.
*H04N 5/225* (2006.01)
*H04N 5/232* (2006.01)
(Continued)

(52) U.S. Cl.
CPC ....... *H04N 5/23219* (2013.01); *H04N 5/2354* (2013.01)

(58) Field of Classification Search
None
See application file for complete search history.

(56) References Cited

U.S. PATENT DOCUMENTS

| | | | |
|---|---|---|---|
| 2001/0008423 A1 | 7/2001 | Nakamura | |
| 2003/0044066 A1* | 3/2003 | Sakaguchi | H04N 5/2354 382/168 |

(Continued)

FOREIGN PATENT DOCUMENTS

| | | |
|---|---|---|
| CN | 101998058 A | 3/2011 |
| JP | 2001194576 A | 7/2001 |

(Continued)

OTHER PUBLICATIONS

Office Action issued in corresponding Japanese Patent Application No. 2014-027745 dated Jul. 11, 2017, consisting of 11 pp. (English Translation Provided).

(Continued)

*Primary Examiner* — Kate Luo
(74) *Attorney, Agent, or Firm* — Volpe and Koenig, P.C.

(57) ABSTRACT

A display device includes an image pickup device, a stroboscope, and a stroboscopic image prediction creation unit. The stroboscope applies stroboscopic light to a subject together with the photography by the image pickup device. The stroboscopic image prediction creation unit acquires distance distribution information showing the distribution of distance information relative to the subject of the photography of the subject together with the application of stroboscopic light, and predict in advance, on the basis of the distance distribution information, a stroboscopic image for the photography of the subject together with the application of the stroboscopic light.

12 Claims, 18 Drawing Sheets

(51) Int. Cl.
*G01B 11/14* (2006.01)
*H04N 5/235* (2006.01)

(56) References Cited

U.S. PATENT DOCUMENTS

| | | | |
|---|---|---|---|
| 2008/0074535 A1* | 3/2008 | Ohsuga | H04N 5/232 348/371 |
| 2008/0166052 A1* | 7/2008 | Hatano | G06K 9/00221 382/190 |
| 2009/0096898 A1* | 4/2009 | Sambongi | H04N 5/202 348/254 |
| 2009/0123143 A1* | 5/2009 | Tamura | G03B 15/05 396/164 |
| 2011/0043639 A1* | 2/2011 | Yokohata | H04N 5/232 348/169 |
| 2013/0107048 A1* | 5/2013 | Rottner | H04N 5/23238 348/148 |
| 2013/0176457 A1* | 7/2013 | Yasuhiro | H04N 5/77 348/231.99 |
| 2013/0266223 A1* | 10/2013 | Zhang | G06T 7/0081 382/173 |

FOREIGN PATENT DOCUMENTS

| | | |
|---|---|---|
| JP | 2001251553 A | 9/2001 |
| JP | 2010004367 A | 1/2010 |
| JP | 2011175529 A | 9/2011 |
| JP | 2012029054 A | 2/2012 |
| JP | 2012-078676 | 4/2012 |
| JP | 2013118472 A | 6/2013 |
| JP | 2013162412 A | 8/2013 |

OTHER PUBLICATIONS

Office Action issued in corresponding Chinese Patent Application No. 201510075477.0 dated Jun. 5, 2017, consisting of 27 pp. (English Translation Provided).

* cited by examiner

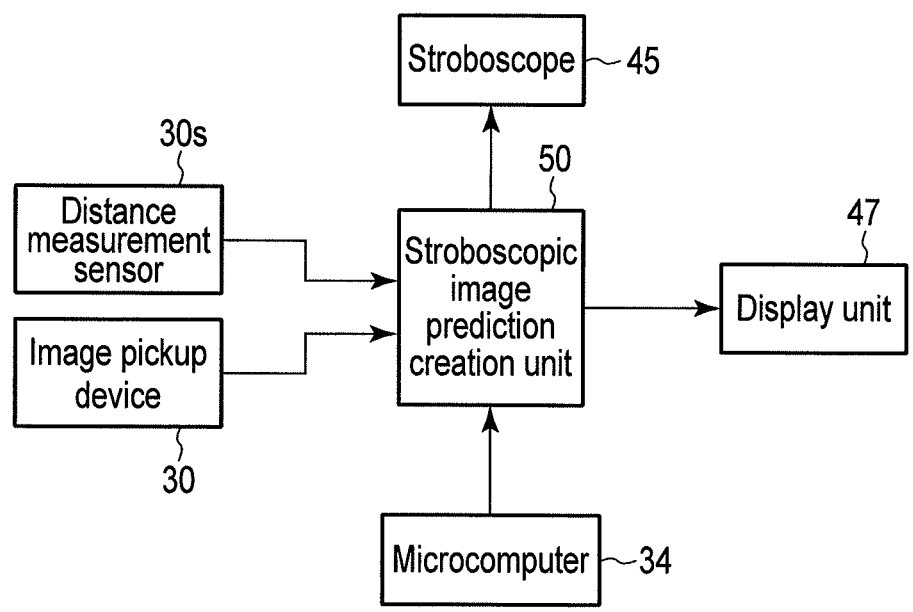
F I G. 1

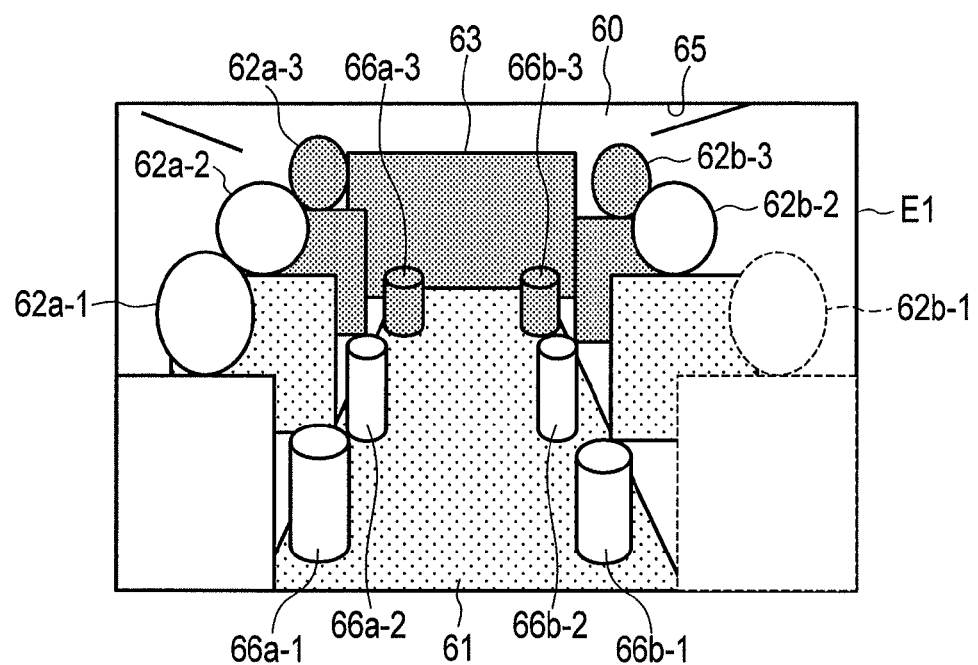
F I G. 5
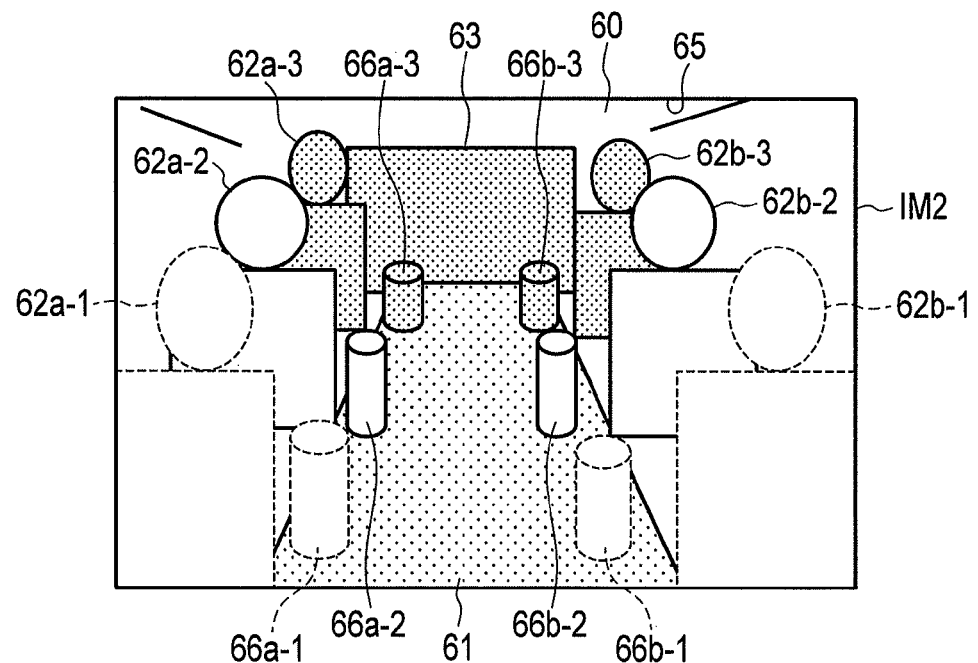
F I G. 6

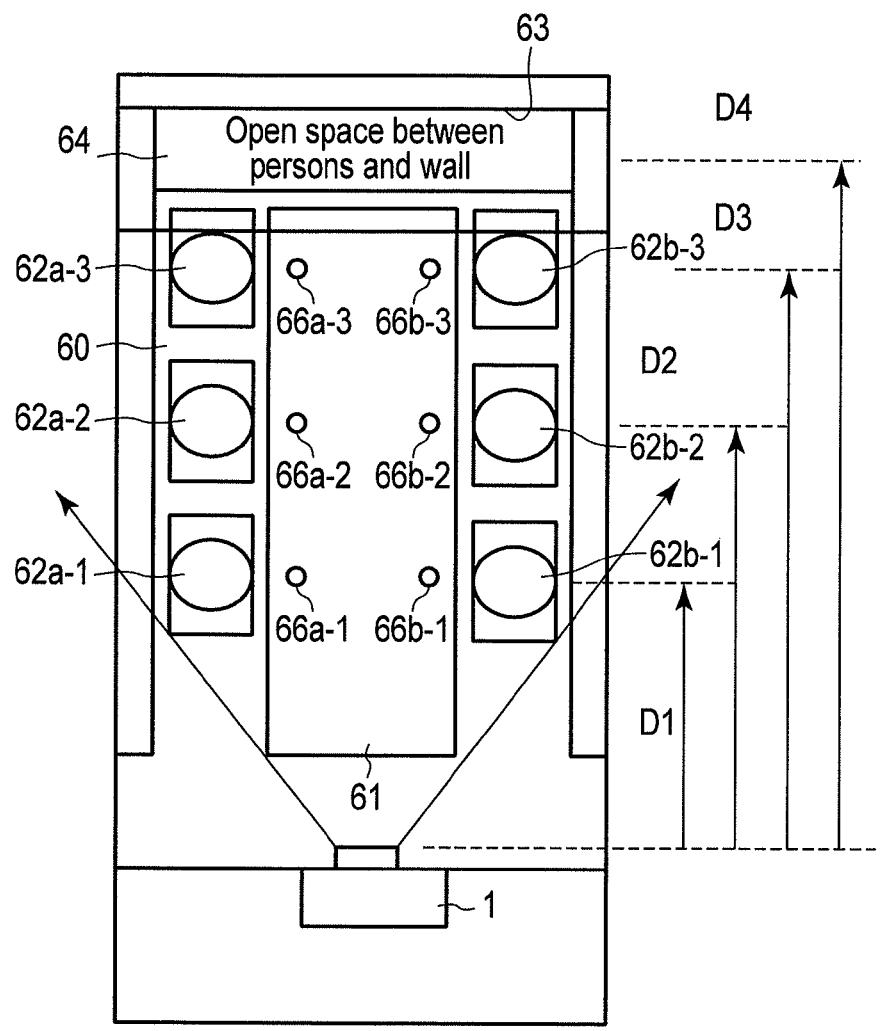
F I G. 7
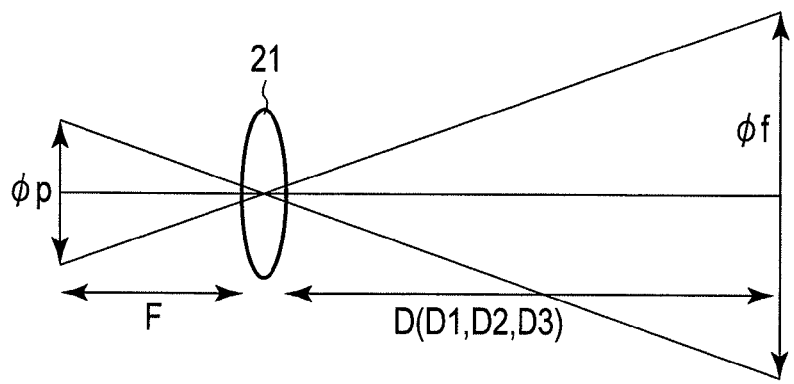
F I G. 8

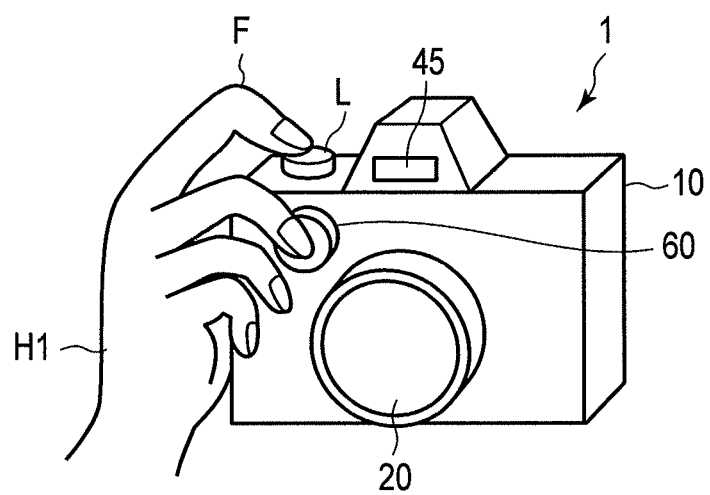
F I G. 10

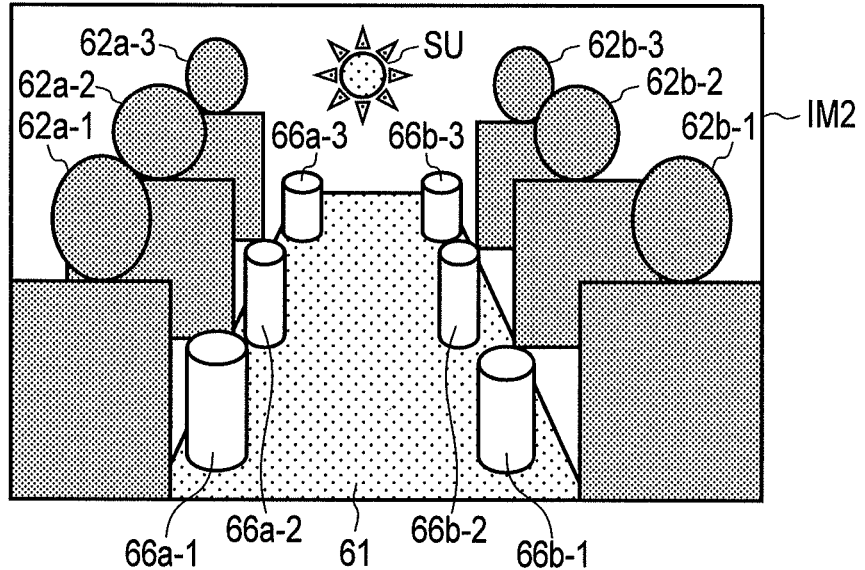
F I G. 11
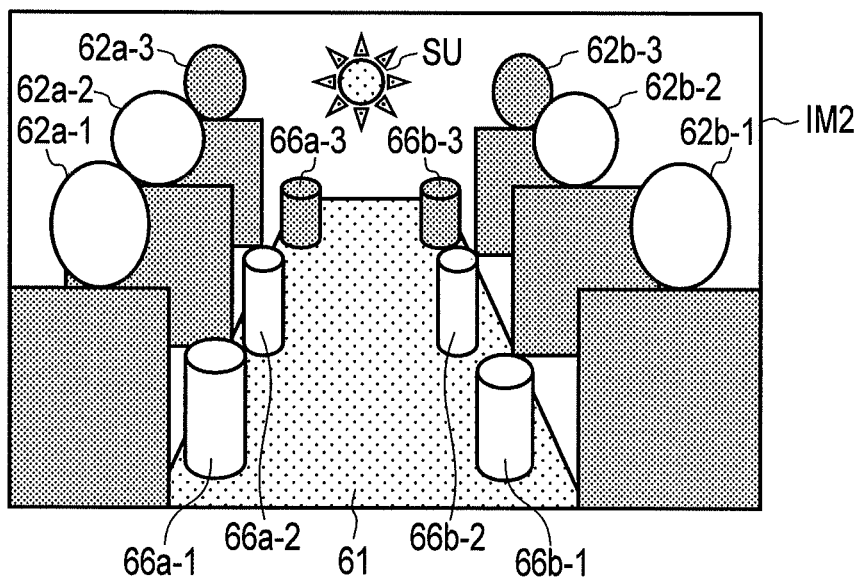
F I G. 12

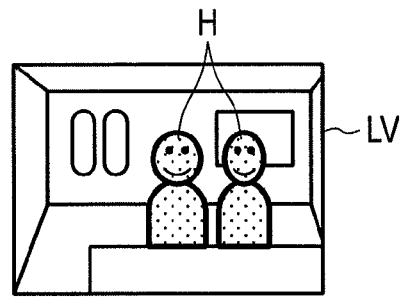
F I G. 21
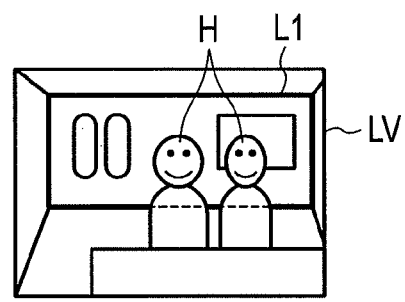
F I G. 22A
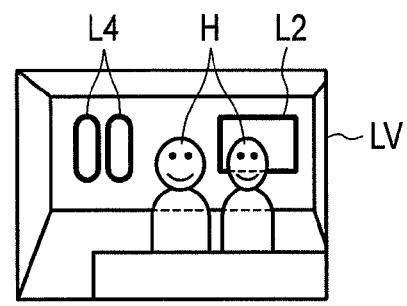
F I G. 22B

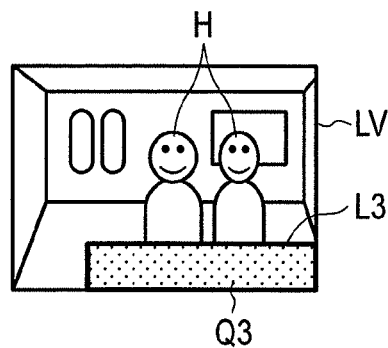
F I G. 24
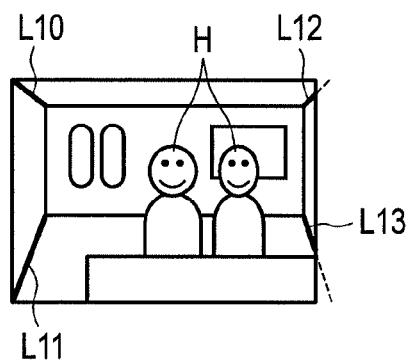
F I G. 25
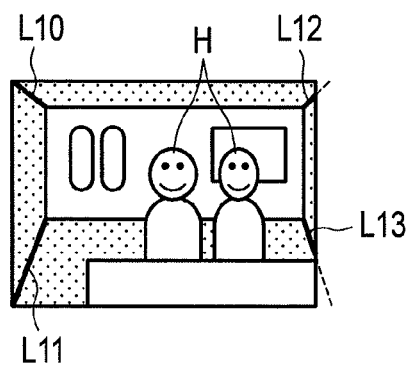
F I G. 26

PHOTOGRAPHIC APPARATUS, STROBOSCOPIC IMAGE PREDICTION METHOD, AND A NON-TRANSITORY COMPUTER READABLE STORAGE MEDIUM STORING STROBOSCOPIC IMAGE PREDICTION PROGRAM

CROSS-REFERENCE TO RELATED APPLICATIONS

This application is based upon and claims the benefit of priority from the prior Japanese Patent Applications No. 2014-027745, Feb. 17, 2014, the entire contents of which are incorporated herein by reference.

BACKGROUND OF THE INVENTION

1. Field of the Invention

The present invention relates to a photographic apparatus, a stroboscopic image prediction method, and a non-transitory computer readable storage medium storing a stroboscopic image prediction program for creating an image in which the brightness of a subject is predicted at the time of stroboscopic photography.

2. Description of the Related Art

A photographic apparatus such as a digital camera can be set to perform photography with stroboscopic light emission in a dark place, for example, in a room or at night. If only set to a stroboscopic photography mode, the photographic apparatus can obtain a stroboscopic image, but without regard to the brightness of a subject obtained by stroboscopic photography. The stroboscopic image obtained by the stroboscopic photography may be an extremely bright image having high luminance, or may be a dark image having low luminance because of stroboscopic light not reaching the subject. Therefore, the stroboscopic image may be different from an image expected by the stroboscopic photography.

Jpn. Pat. Appln. KOKAI Publication No. 2012-78676 discloses measuring a distance (subject distance) between the main apparatus and a subject, acquiring the subject distance per block in a photographic screen, calculating a traveling distance of flash light during photography, determining per block whether the flash light reaches the subject on the basis of the subject distance and the traveling distance, and, regarding blocks for which it has been determined that the flash light does not reach, differentiating the display style of a through-image from those of the other blocks.

BRIEF SUMMARY OF THE INVENTION

A photographic apparatus according to an aspect of the present invention comprises, an image pickup device which photographs a subject and then outputs an image signal, a stroboscope which applies stroboscopic light to the subject together with the photography by the image pickup device, a stroboscopic image prediction creation unit which acquires distance distribution information showing the distribution of distance information relative to the subject of the photography of the subject together with the application of the stroboscopic light, and predict in advance, on the basis of the distance distribution information, a stroboscopic image for the photography of the subject together with the application of the stroboscopic light and a display unit which displays the stroboscopic image.

A stroboscopic image prediction method according to an aspect of the present invention comprises, acquiring distance distribution information showing the distribution of distance information relative to a subject of photography of the subject together with the application of stroboscopic light, predicting in advance, on the basis of the distance distribution information, a stroboscopic image for the photography of the subject together with the application of the stroboscopic light, and displaying the predicted stroboscopic image on a display unit.

A non-transitory computer readable storage medium storing a stroboscopic image prediction program according to an aspect of the present invention comprises, a distance distribution information acquiring function to acquire distance distribution information showing the distribution of distance information relative to a subject of photography of the subject together with the application of stroboscopic light, a predicting function to predict in advance, on the basis of the distance distribution information, a stroboscopic image for the photography of the subject together with the application of the stroboscopic light, and a display function to display the predicted stroboscopic image on a display unit.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic block configuration diagram showing a first embodiment of an imaging apparatus according to the present invention;

FIG. 5 is a diagram showing an example of a stroboscopic predictive image which is previously created if a subject image is photographed with the stroboscope;

FIG. 6 is a diagram showing a subject image in which the amount of stroboscopic light is increased, the aperture amount is increased, and the sensitivity is increased at the time of stroboscopic photography by the same apparatus;

FIG. 7 is an arrangement plan showing the inside of a room such as a conference room or a conversation room which is an example of a subject for the same apparatus when seen from above;

FIG. 8 is a diagram illustrating how to calculate each distance to each photography subject person in a depth direction which is an example of a subject for the same apparatus;

FIG. 10 is an appearance diagram showing a second embodiment of an imaging apparatus according to the present invention;

FIG. 11 is a diagram showing an example of a subject image photographed in daylight synchro mode by the same apparatus;

FIG. 12 is a diagram showing a stroboscopic predictive image photographed with the stroboscope in the daylight synchro mode by the same apparatus;

FIG. 21 is a diagram showing a human shape detected in a live view image displayed by the same apparatus;

FIG. 22A is a diagram showing an example of a line part in which pieces of distance information detected by the same apparatus are arranged at the same distance;

FIG. 22B is a diagram showing an example of a line part in which the pieces of distance information detected by the same apparatus are arranged at the same distance;

FIG. 24 is a diagram showing a region which is detected by the same apparatus and which is surrounded by a line part and the outer edge of a live view image;

FIG. 25 is a diagram showing boundaries between a ceiling and walls in a room which are detected by the same apparatus and which have different distance information and which are linearly arranged;

FIG. 26 is a diagram showing locations determined by the same apparatus where pieces of linearly arranged distance information face each other and where the change of the distance information is the same;

DETAILED DESCRIPTION OF THE INVENTION

[First Embodiment]

Figure 2:
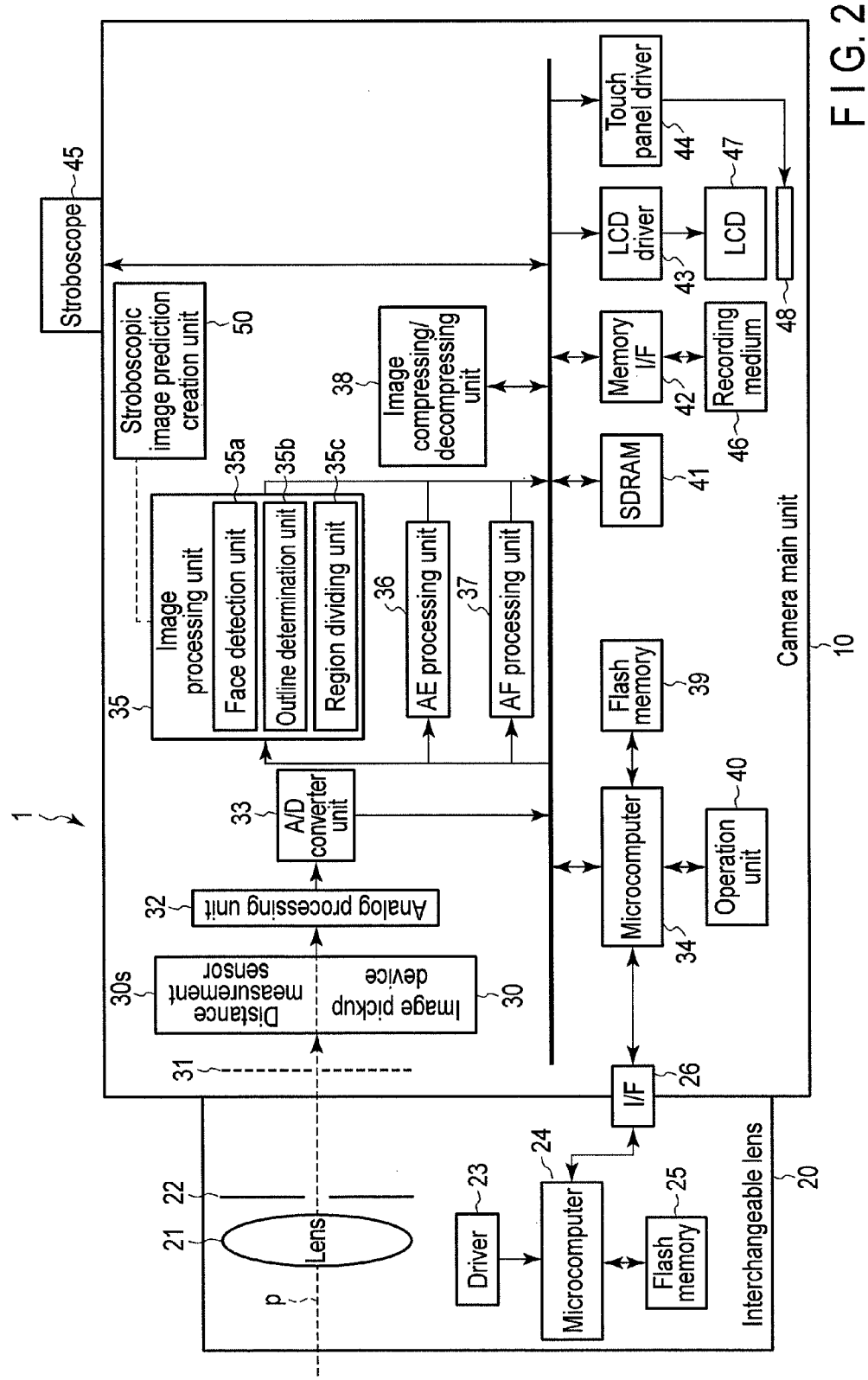
FIG. 2 is a detailed configuration diagram of the same apparatus.

A first embodiment of the present invention is described below with reference to the drawings.

FIG. 1 shows a schematic block configuration diagram of a photographic apparatus (hereinafter referred to as the main apparatus) which performs stroboscopic photography for a subject including a main subject. The main apparatus includes an image pickup device 30 and a distance measurement sensors 30$s$. The image pickup device 30 receives an incoming subject image, and converts this subject image to an image signal corresponding to the light amount. The image signal output from the image pickup device 30 is sent to a stroboscopic image prediction creation unit 50.

The distance measurement sensors 30$s$ measures the distance to the subject that includes the main subject, and outputs a distance measurement signal. The distance measurement signal is sent to the stroboscopic image prediction creation unit 50. The distance measurement sensors 30$s$ measures the distance to the subject by, for example, a phase contrast detection method. According to the phase contrast detection method, the image pickup device 30 containing a plurality of phase contrast pixels is used. According to the phase contrast detection method, the defocus direction and amount are detected from the gap between two images based on the output signal of each phase contrast pixel, and autofocus (AF) is performed on the main subject on the basis of the direction and amount, along with detection of the distance between the main apparatus and the subject.

The distance between the main apparatus and the main subject acquired from the difference of output signals of the phase contrast pixels in the image pickup device 30 (hereinafter described as distance information), and stroboscopic photography information including the amount of stroboscopic light corresponding to the guide number of a stroboscope 45 are input to the stroboscopic image prediction creation unit 50. The stroboscopic image prediction creation unit 50 predicts a stroboscopic image (flash image) by the stroboscopic photography on the basis of the distance information between the main apparatus and the subject, and the stroboscopic photography information before stroboscopic photography. The predicted stroboscopic image is hereinafter referred to as a stroboscopic predictive image.

A microcomputer 34, the stroboscope 45, and a display unit 47 are connected to the stroboscopic image prediction creation unit 50.

The microcomputer 34 sends stroboscopic photography information including sensitivity, an aperture amount, and the amount of stroboscopic light to the stroboscopic image prediction creation unit 50.

The stroboscope 45 emits stroboscopic light if supplied with electric power in response to an emission instruction issued from the microcomputer 34.

The display unit 47 includes, for example, a liquid crystal display (LCD).

The stroboscopic image prediction creation unit 50 is described below in detail.

The stroboscopic image prediction creation unit 50 creates a stroboscopic predictive image in advance relative to the subject of the photography of the subject including the main subject together with the application of the stroboscopic light from the stroboscope 45. Specifically, the stroboscopic image prediction creation unit 50 acquires distance distribution information showing the distribution of the distance information relative to the subject of the photography of the subject including the main subject together with the application of the stroboscopic light from the stroboscope 45. On the basis of the distance distribution information, the stroboscopic image prediction creation unit 50 creates the stroboscopic predictive image in the case of stroboscopic photography in advance.

The stroboscopic image prediction creation unit 50 divides the subject into pieces of region information in accordance with the distribution of the distance information in the distance distribution information, and performs image processing for each piece of region information to create a stroboscopic predictive image.

Specifically, the distance measurement signal output from the distance measurement sensors 30s is previously input to the stroboscopic image prediction creation unit 50 for the stroboscopic photography with the light emission of the stroboscope 45. The stroboscopic image prediction creation unit 50 finds the distance between the main apparatus and the subject from the distance measurement signal, and matches this distance to the position measured by the distance distribution information to acquire distance distribution information relative to the subject.

Stroboscopic photography information including sensitivity, an aperture amount, and the amount of stroboscopic light is input to the stroboscopic image prediction creation unit 50 from the microcomputer 34. The stroboscopic image prediction creation unit 50 creates the stroboscopic predictive image for stroboscopic photography on the basis of the distance distribution information and the stroboscopic photography information. This stroboscopic predictive image is displayed on the display unit 47.

The main apparatus 1 creates a precise stroboscopic predictive image in which the brightness of the subject at the time of stroboscopic photography is predicted before stroboscopic photography and then displays the stroboscopic predictive image on the display unit 47. Thus, the main apparatus 1 permits a user to see the stroboscopic predictive image to be obtained by the stroboscopic photography, and can provide precise assistance for stroboscopic photography.

The detailed configuration of the main apparatus 1 is described below with reference to FIG. 2. The same parts as those in FIG. 1 are provided with the same reference signs and are not described in detail.

The main apparatus 1 includes a camera main unit 10, and an interchangeable lens 20 attachable to the camera main unit 10. The main apparatus 1 is applicable to a compact camera, or a mobile telephone equipped with an imaging function.

The interchangeable lens 20 includes an optical lens 21, a diaphragm 22, a driver 23, a lens side microcomputer 24, and a flash memory 25. The optical lens 21 sends a subject image from a subject to the image pickup device 30 of the camera main unit 10, and includes a focus lens and a zoom lens. The focus lens is driven along an optical axis p of the optical lens 21 to adjust the focus on the subject. The zoom lens is driven along the optical axis p of the optical lens 21 to adjust the zoom relative to the subject. The diaphragm 22 varies the size of its aperture to adjust the brightness of the subject image.

The driver 23 drives the focus lens of the optical lens 21 along the optical axis p of the optical lens 21. The driver 23 drives the zoom lens along the same optical axis p. The driver 23 drives the diaphragm 22 to vary its size.

The flash memory 25 is a rewritable nonvolatile memory. A program for controlling the operation of the whole lens, such as a control parameter for controlling the operation of the interchangeable lens 20, is previously stored in the flash memory 25.

In response to a lens control instruction sent from the camera main unit 10, the lens side microcomputer 24 drives and controls the driver 23 in accordance with the lens control instruction and the previously stored control parameter, to control the focus lens of the optical lens 21 in the direction of the optical axis p, drives the zoom lens in a direction along the same optical axis p, and to control the size of the diaphragm 22.

The lens side microcomputer 24 communicates with the camera main unit 10 via an interface (I/F) 26, drives and controls the interchangeable lens 20, for example, in response to a lens control instruction to the interchangeable lens 20 from the camera main unit 10, and performs operation control to send, to the camera main unit 10, a response to the lens control instruction.

The image pickup device 30 is mounted on the camera main unit 10. The image pickup device 30 is disposed on the optical axis p of the optical lens 21. A shutter 31 is provided in front of the image pickup device 30. The image pickup device 30 receives the subject image that comes in via the optical lens 21, and converts this subject image to an image signal corresponding to the amount of light. An output terminal of the image pickup device 30 is connected to an A/D converter 33 via an analog processing unit 32.

On the imaging surface of the image pickup device 30, more than one distance measurement sensors 30s are arranged at predetermined intervals on a two-dimensional plane on the imaging surface. Each of the distance measurement sensors 30s measures the distance to the main subject included in the subject as described above. The distance measurement sensors 30s detect the distance to the subject by the phase contrast detection method. A hill-climbing method is used in AF. According to the hill-climbing method, the focus lens of the optical lens 21 is operated to scan in the direction of the optical axis p to acquire the change of the contrast value, and a peak of this contrast value is detected to detect a focus position. If the focus position is detected by the hill-climbing method, the distance information relative to the main subject can be obtained. This distance information has only to show the far-and-near relationship with the main subject rather than strictly showing the distance from the main subject.

The main unit side microcomputer 34 is mounted on the camera main unit 10. The A/D converter 33, an image processing unit 35, an AE processing unit 36, an AF processing unit 37, an image compressing/decompressing unit 38, a flash memory 39, an operation unit 40, an SDRAM 41, a memory I/F 42, a liquid crystal display (LCD) driver 43, a touch panel driver 44, and the stroboscope 45 are connected to the main unit side microcomputer 34. A recording medium 46 is connected to the memory I/F 42. The display unit (rear monitor) 47 is connected to the LCD driver 43. A touch panel 48 is connected to the touch panel driver 44.

The flash memory 39 is a rewritable nonvolatile memory. A control program for controlling the overall camera operation such as imaging, reproduction, operation, and display, is previously stored in the flash memory 39. User settings are also stored in the flash memory 39. Still image data and moving image data are stored in the flash memory 39. The still image data and the moving image data are read from the flash memory 39 and then reproduced and displayed on the display unit 47.

A stroboscopic image previous acquisition program is stored in the flash memory 39. The stroboscopic image previous acquisition program enables the main unit side microcomputer 34 which performs photography of the subject together with the stroboscopic light application to perform a distance distribution information acquiring function, a stroboscopic predictive image creating function, and a display function. The distance distribution information acquiring function acquires distance distribution information showing the distribution of the distance information relative to the subject on the basis of the output signal of the distance measurement sensors 30s in advance of the photography of the subject together with the stroboscopic light application. The stroboscopic predictive image creating function predicts a stroboscopic image in the photography of the subject together with the application of stroboscopic light on the basis of the distance distribution information. The display function is configured to display the stroboscopic predictive image on the display unit 47.

The distance distribution information showing the distribution of the distance information relative to the subject shows the distribution of the distance information in a three-dimensional photography space from the main apparatus 1 to the subject.

The stroboscopic predictive image creating function divides the region of the subject within the image data into pieces of region information in accordance with the distance distribution information in the three-dimensional photography space, and performs image processing for each piece of divided region information to create the stroboscopic predictive image.

The stroboscopic predictive image creating function performs image processing to change the brightness in the image data in accordance with each piece of distance information relative to the subject based on the distance distribution information and then creates the stroboscopic predictive image. For example, the prediction function creates the stroboscopic predictive image by performing image processing so that the farther part of the subject is darker and so that the nearer part of the subject is brighter.

In the image processing to brighten the part of the subject, the brightness of the part of the subject in the image data is corrected. This brightening image processing is performed as follows.

The image data regarding the subject is obtained by the image processing of the image signal output from the image pickup device 30.

The distance distribution information relative to the subject is obtained on the basis of the output signal of the distance measurement sensors 30s.

If the image data including the subject is a set of points, the distance information obtained on the basis of the output signal of the distance measurement sensors 30s can be associated with each point on the image data.

Therefore, if, for example, the points having the same distance on the image data including the subject are detected, a set of these detected points is formed. If the positions (coordinates) of the points are detected along the outer circumference of the set of the points, a region surrounded by these points and having the same distance is formed. Therefore, this region has region information (surface information) having the same distance.

The distance distribution information shows the distribution of the distance information between the main apparatus 1 and the subject. Therefore, in other words, the distance distribution information shows the far-and-near relationship between the main apparatus 1 and each part of the subject in the photography space where photography is performed by the main apparatus 1.

Since the subject includes a main subject such as the face of a person and a background, the distance from the main apparatus 1 to each part of the subject including the main subject and the background is varied. Therefore, the image data including the subject can be divided by pieces of region information corresponding to pieces of different distance information. In the division of the image data into the pieces of region information, for example, if the face of the person is detected, the region including the face may be divided as the region information having the same distance.

Therefore, the image processing to brighten the part of the subject is performed for each piece of region information divided on the image data including the subject.

For a region having no contrast in the image data, distance information is estimated from each piece of distance information for each piece of region information (surface information) around the region having no contrast, and the brightness of the region of the image data having no contrast is corrected from the estimated distance information.

The region information may be configured so that the region where the face of the person is detected is a specific region.

The stroboscopic predictive image creating function acquires distance distribution information between the main apparatus 1 and the face if the face is included in the subject, and creates a stroboscopic predictive image on the basis of the distance distribution information.

The stroboscopic predictive image creating function finds the traveling distance of stroboscopic light emitted at the time of stroboscopic photography on the basis of the distance distribution information, and to predict the brightness of the subject on the basis of the traveling distance of the stroboscopic light and the amount of stroboscopic light emitted at the time of stroboscopic photography, and thereby create the stroboscopic predictive image.

The operation unit 40 includes various operation members manually operated by the user. The various operation members include an operation terminal for manual zoom operation of the optical lens 21, an operation terminal for focus adjustment to the subject, and an operation terminal for the operation of the diaphragm 22 to adjust the brightness of the subject. The operation unit 40 includes, for example, a release button, a moving image button, a mode dial, a selection key, and a power supply button.

The operation unit 40 includes a stroboscopic mode switch for setting and canceling a stroboscopic mode, and a predictive image instruction switch for instructing to create a stroboscopic predictive image when the stroboscopic mode is set by the operation of the stroboscopic mode switch. The operation unit 40 is not exclusively provided with the two switches: the stroboscopic mode switch and the predictive image instruction switch. For example, the operation unit 40 may be only provided with the stroboscopic mode switch, and may set the stroboscopic mode in response to the operation of the stroboscopic mode switch and also instruct to create a stroboscopic predictive image.

The release button includes a 1st release switch and a 2nd release switch. The 1st release switch is turned on if the user presses the release button halfway. When the 1st release switch is turned on, the main unit side microcomputer 34 instructs the AF processing unit 37 to perform a photography preparation operation such as AF processing. The 2nd release switch is turned on if the user fully presses the release button. If the 2nd release switch is turned on, the main unit side microcomputer 34 instructs the AE processing unit 36 to perform an exposure operation for still image photography. The moving image button is an operation member to instruct to start or end moving image photography. The mode dial is an operation member to select a photography setting of the camera main unit 10, and has, for example, a photography mode, a reproduction mode, and a blur mode. The selection key is an operation member to select and determine an item, for example, on a menu screen. The power supply button is an operation member to turn on or off the power supply of the camera main unit 10.

For example, still image data and moving image data are temporarily stored in the SDRAM 41. The SDRAM 41 is used as a work area for image processing.

The stroboscope 45 performs data communication with the main unit side microcomputer 34 at the time of stroboscopic photography, and emits stroboscopic light in accordance with the stroboscopic light amount indicated by the main unit side microcomputer 34. The stroboscopic light amount is set by, for example, a guide number representing the amount of stroboscopic light.

The recording medium 46 includes, for example, a memory card. Still image data (e.g. JPEG) and moving image data after photography are recorded in the recording medium 46 via the memory I/F 42. The still image data and the moving image data are read from the recording medium 46 to perform reproduction and display.

The display unit 47 is provided in the rear of the camera main unit 10, and is driven by the LCD driver 43 to reproduce and display the still image data and the moving image data. The touch panel 48 is integrally provided on a display screen of the display unit 47.

The touch panel 48 is driven by the touch panel driver 44, detects the contact (touch) by, for example, the finger of the user, and outputs a contact signal including the coordinates of the touched position. The main unit side microcomputer 34 drives the touch panel 48, and the contact signal from the touch panel 48 is input to the main unit side microcomputer 34, and the main unit side microcomputer 34 detects the touch coordinates by the user on the display screen of the display unit 47 from the contact signal.

The image processing unit 35 performs various kinds of image processing for the image data which has been output from the image pickup device 30 and which has been A/D-converted by the A/D converter 33, such as color correction processing, gamma (γ) correction processing, compression processing, and decompression processing for the compressed image data. For example, as shown in FIG. 2, the image processing unit 35 includes a face detection unit 35a, an outline determination unit 35b, and a region dividing unit 35c.

The face detection unit 35a detects the face of a person.

The outline determination unit 35b determines, for example, the outline of the main subject included in the subject.

The region dividing unit 35c divides the image data regarding the subject into pieces of region information (surface information) in accordance with the distance distribution information.

The AE processing unit 36 calculates the luminance of the subject by using the image data which has been output from the image pickup device 30, and which has been A/D-converted by the A/D converter 33, and calculates an aperture amount (aperture value) of the diaphragm 22 at the time of exposure, an exposure time (electronic shutter speed) of the image pickup device 30, or the shutter speed of a mechanical shutter in accordance with the luminance of the subject.

The AF processing unit 37 focuses on the subject by, for example, the hill-climbing method. More specifically, the AF processing unit 37 causes the focus lens of the optical lens 21 to scan in the direction of the optical axis p. In conjunction with this, the image data which has been output from the image pickup device 30 and which has been A/D-converted by the A/D converter 33 is input to the AF processing unit 37, and the AF processing unit 37 acquires the change of the contrast value of the image data. The AF processing unit 37 detects a peak of the contrast value from the change of the contrast value, and detects the detected position of the peak as a focus position for the subject.

The image processing unit 35 includes the function of the stroboscopic image prediction creation unit 50 by previously executing the stroboscopic image previous acquisition program stored in the flash memory 39 for stroboscopic photography.

The stroboscopic image prediction creation unit 50 determines whether the stroboscopic mode is set by the operation of the stroboscopic mode switch of the operation unit 40 and whether the predictive image instruction switch is operated to the condition in which the stroboscopic mode is set. If the predictive image instruction switch is operated, the stroboscopic image prediction creation unit 50 executes the stroboscopic image previous acquisition program, and creates a stroboscopic predictive image for the photography of the subject with the application of stroboscopic light from the stroboscope 45. In this case, the image data, which has been output from the image pickup device 30 and which has been A/D-converted by the A/D converter 33, is input to the stroboscopic image prediction creation unit 50, and the stroboscopic image prediction creation unit 50 performs, for the image data, image processing that changes for each piece of region information regarding the subject to create a stroboscopic predictive image.

Since the user operates the predictive image instruction switch to refer to the stroboscopic predictive image in advance of stroboscopic photography, the stroboscopic predictive image is naturally created before the stroboscopic photography.

Therefore, each piece of distance information relative to the subject acquired by the distance measurement in the distance measurement sensors 30s is input to the stroboscopic image prediction creation unit 50 in advance of stroboscopic photography, and the stroboscopic image prediction creation unit 50 matches the distance information to the location of each distance measurement sensors 30s on an imaging surface of the image pickup device 30 to create the distance distribution information, and creates the stroboscopic predictive image on the basis of the distance distribution information.

Since the distance distribution information matches each piece of distance information relative to the subject to the location of each distance measurement sensors 30s, the distance information from the main apparatus 1 to the subject is acquired in multiple locations corresponding to the locations of the distance measurement sensors 30s. Therefore, the distance distribution information between the main apparatus 1 and the subject shows the distribution of the distance information to the subject in the three-dimensional photography space where photography is performed by the main apparatus 1. In other words, the distance distribution information shows the far-and-near relationship in the three-dimensional photography space based on the difference of distance from the main apparatus 1 to the subject. The distance distribution information permits the setting of, for example, three-dimensional coordinate axis (x, y, z), and permits the position of each piece of distance information to be represented by the coordinates (x, y, z).

The stroboscopic image prediction creation unit 50 divides the subject into pieces of region information according to the distance information in the three-dimensional photography space, and creates the stroboscopic predictive image on the basis of the region information. In this case, if the stroboscopic image prediction creation unit 50 detects, for example, points having the same distance on the image data based on the distance distribution information in the three-dimensional photography space, the stroboscopic image prediction creation unit 50 detects positions of the detected points along the outer circumference of the set of the points, and acquires the region surrounded by the detected points as region information having the same distance.

If the stroboscopic image prediction creation unit 50 detects the region information including the face of the person detected by the face detection unit 35a among the pieces of region information, the stroboscopic image prediction creation unit 50 determines this region information as specific region information. The specific region information may not only include the face, but also include the chest, arms, and legs of a person, their entire body, and flowers or mountains.

The stroboscopic image prediction creation unit 50 finds distances from the main apparatus 1 to the main subject and background which are included in the subject in the three-dimensional photography space on the basis of the distance distribution information in the three-dimensional photography space. On the basis of these distances, the stroboscopic image prediction creation unit 50 estimates the far-and-near relationship dependent on the difference in distance from the main apparatus 1 to the main subject and its background.

The stroboscopic image prediction creation unit 50 changes the brightness of the stroboscopic image in accordance with the distance information included in the distance distribution information in the three-dimensional photography space. To create a stroboscopic predictive image with the changing brightness of the stroboscopic image, it is important to obtain the distance distribution information in the three-dimensional photography space. That is, the stroboscopic image prediction creation unit 50 creates a stroboscopic predictive image by image processing to decrease the luminance of the comparatively far part of the subject (darken the image) in accordance with the distance information. In this case, the stroboscopic image prediction creation unit 50 decreases the luminance of this part of the subject by a predetermined value as the distance from the main apparatus 1 to the subject increases by a predetermined distance.

The stroboscopic image prediction creation unit 50 creates the stroboscopic predictive image by image processing to increase the luminance of the comparatively closer part of the subject (brighten the image) in accordance with the distance information. In this case, the stroboscopic image prediction creation unit 50 increases the luminance of this part of the subject by a predetermined value as the distance from the main apparatus 1 to the subject decreases by a predetermined distance.

Regarding the far side and the near side, for example, a distance serving as a reference (reference distance) is set between the main apparatus 1 and the subject, and the side far from the main apparatus 1 with respect to the reference distance is the far side, and the side near the main apparatus 1 is the near side.

Specifically, if creating a stroboscopic predictive image, the stroboscopic image prediction creation unit 50 performs image processing to increase luminance by a predetermined value and brighten the subject in accordance with the stroboscopic light amount if the amount of the stroboscopic light applied to the subject by stroboscopic photography is equal to or more than a set amount.

To create a stroboscopic predictive image, the stroboscopic image prediction creation unit 50 performs image processing to change the brightness on the basis of the distance distribution information between the main apparatus 1 and the subject, and the stroboscopic photography information including sensitivity, aperture amount, and amount of stroboscopic light.

For the region having no contrast in the image data, the stroboscopic image prediction creation unit 50 estimates a distance from each distance of each piece of region information around the region having no contrast, and corrects the brightness of the region having no contrast in the image data in accordance with the estimated distance.

If a face is included in the subject, the stroboscopic image prediction creation unit 50 acquires distance distribution information between the main apparatus 1 and the face, and creates a stroboscopic predictive image on the basis of the distance distribution information.

The stroboscopic image prediction creation unit 50 finds the traveling distance of stroboscopic light emitted from the stroboscope 45 at the time of stroboscopic photography on the basis of the distance distribution information, and predicts the brightness of the subject on the basis of the traveling distance of the stroboscopic light and the amount of the stroboscopic light emitted at the time of the stroboscopic photography, and thereby creates a stroboscopic predictive image.

The stroboscopic predictive image created by the stroboscopic image prediction creation unit 50 is displayed on the display unit 47 driven by the LCD driver 43.

Now, an example of stroboscopic photography performed by the user using the main apparatus 1 having the function of the stroboscopic image prediction creation unit 50 is described.

Figure 3:
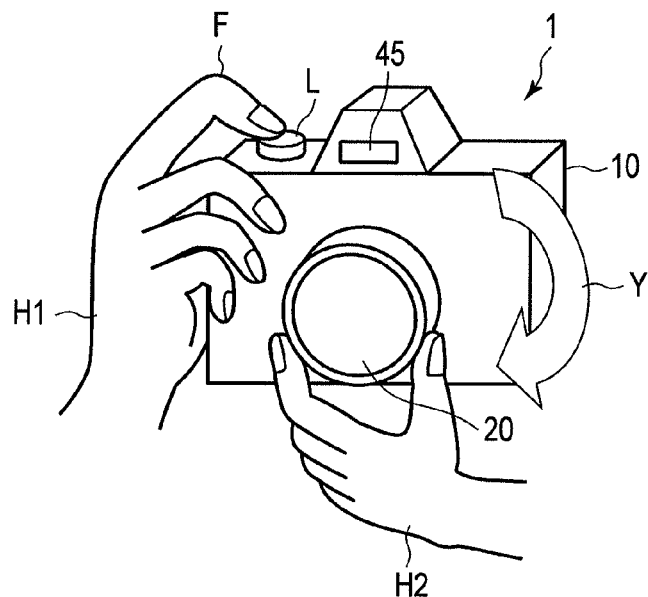
FIG. 3 is a diagram showing how a user holds the same apparatus to perform stroboscopic photography.

FIG. 3 shows an example of how the user grasps the main apparatus 1 to perform stroboscopic photography. The main apparatus 1 is held by, for example, both hands H1 and H2 of the user. A ring for moving the focus lens of the optical lens 21 is rotated by the left hand H2 in an arrow Y direction to adjust focus. A release button L is to be pressed by a forefinger F of the right hand H1.

Figure 4:
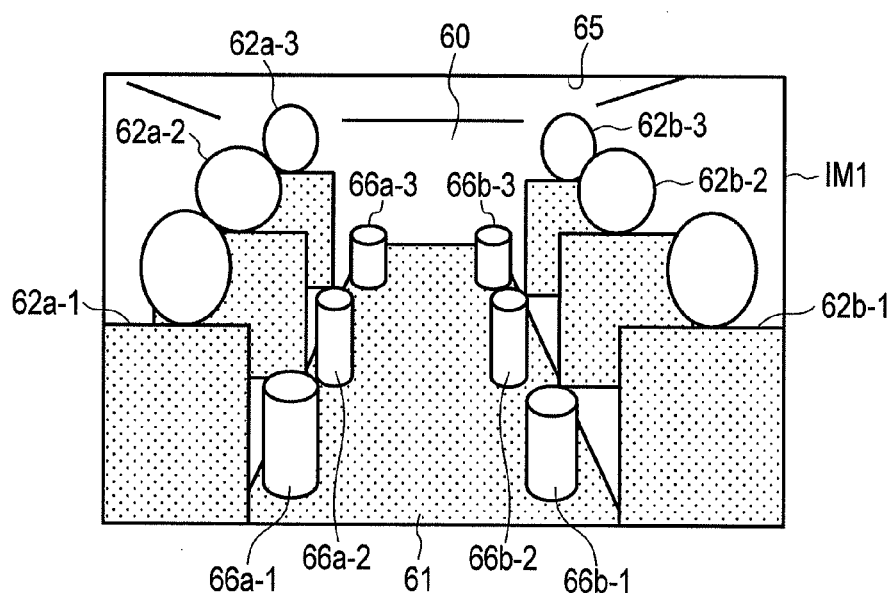
FIG. 4 is a diagram showing an example of a subject image to be photographed with a stroboscope by the same apparatus.

FIG. 4 shows an example of a subject image IM1 to be photographed by the user with the stroboscope holding the main apparatus 1 as shown in FIG. 3. The subject in the subject image IM1 is the inside of a room 60 such as a conference room or a conversation room. A table 61 is put in the room 60. The table 61 has a rectangular shape, and is longitudinally directed from the near side of the user to the far side. Photography subject persons 62a-1 to 62a-3, and 62b-1 to 62b-3 are seated on both sides of the table 61 across the table 61. Glasses 66a-1 to 66a-3 and 66b-1 to 66b-3 are put on the table 61 in accordance with the photography subject persons 62a-1 to 62a-3, and 62b-1 to 62b-3.

FIG. 5 shows an example of a stroboscopic predictive image E1 which is previously created for the photography of the subject image IM1 with the stroboscope. In the stroboscopic predictive image E1, stroboscopic light has not reached the photography subject persons 62a-3 and 62b-3 seated on the far side, a far-side wall 63, and the glasses 66a-3 and 66b-3, which are dark image parts having low luminance.

FIG. 6 shows a subject image IM2 in which the amount of stroboscopic light of the stroboscope 45 is increased, the aperture amount of the diaphragm 22 is decreased, and the sensitivity is increased at the time of stroboscopic photography. In the subject image IM2, the stroboscopic light has reached the photography subject persons 62a-3 and 62b-3, the far-side wall 63, and the glasses 66a-3 and 66b-3, showing an image brighter than the stroboscopic predictive image E1 shown in FIG. 5, that is, an image in which the luminance has increased by a predetermined value.

The determination of whether the stroboscopic light emitted from the stroboscope 45 reaches the subject in, for example, the room 60 shown in FIG. 4 is described.

FIG. 7 shows an arrangement plan of the inside of the room 60, for example, a conference room or a conversation room shown in FIG. 4 when seen from above. A space 64 exists between the far-side wall 63 and the table 61. The distance from the main apparatus 1 to the photography subject persons 62a-1 and 62b-1 is the same distance D1. The distance from the main apparatus 1 to the photography subject persons 62a-2 and 62b-2 is the same distance D2. The distance from the main apparatus 1 to the photography subject persons 62a-3 and 62b-3 is the same distance D3.

FIG. 8 shows a diagram illustrating how to calculate distances D1, D2, and D3 to the photography subject persons 62a-1 to 62a-3 and 62b-1 to 62b-3. Each of the distances D1, D2, and D3 is found on the basis of, for example, the size φp of the face of each of the photography subject persons 62a-1 to 62a-3 and 62b-1 to 62b-3.

In the main apparatus 1, the face detection unit 35a recognizes the face of each of the photography subject persons 62a-1 to 62a-3 and 62b-1 to 62b-3 by the eyes, nose, mouth, complexion, etc., and can track the motion of the face of each of the photography subject persons 62a-1 to 62a-3 and 62b-1 to 62b-3 by tracking these facial features. In this tracking, the tracking position of the face of each of the photography subject persons 62a-1 to 62a-3 and 62b-1 to 62b-3 can be detected.

If the motion of the face of each of the photography subject persons 62a-1 to 62a-3 and 62b-1 to 62b-3 is tracked, each of the distances D1, D2, and D3 to the tracked faces of the photography subject persons 62a-1 to 62a-3 and 62b-1 to 62b-3 can be sequentially found on the basis of the distance measurement signal output from the distance measurement sensors 30s. That is, each of the distances D1, D2, and D3 (=D) can be found by calculating $$D = F \cdot \phi f / \phi p \quad (1)$$

wherein F is the focal distance of the optical lens 21, φf is the size of the face of each of the photography subject persons 62a-1 to 62a-3 and 62b-1 to 62b-3, and φp is the size of the face imaged on the imaging surface of the image pickup device 30, as shown in FIG. 8.

Each of the distances D1, D2, and D3 to the photography subject persons 62a-1 to 62a-3 and 62b-1 to 62b-3 changes with the size φp of the face of each of the photography subject persons 62a-1 to 62a-3 and 62b-1 to 62b-3. That is, the distance between the main apparatus 1 and the face is smaller when the size φp of the face is larger, and the distance between the main apparatus 1 and the face is greater when the size φp of the face is smaller. The size φp of the face can be, for example, about 15 cm.

Therefore, if each of the distances D1, D2, and D3 to the photography subject persons 62a-1 to 62a-3 and 62b-1 to 62b-3 is detected and matched to the tracking position of the motion of the face of each of the photography subject persons 62a-1 to 62a-3 and 62b-1 to 62b-3, distance distribution information between each face and the main apparatus 1 can be acquired.

If each of the distances D1, D2, and D3 to the photography subject persons 62a-1 to 62a-3 and 62b-1 to 62b-3 is found, whether the stroboscopic light reaches each of the photography subject persons 62a-1 to 62a-3 and 62b-1 to 62b-3 can be determined. That is, the amount of the stroboscopic light applied to each of the photography subject persons 62a-1 to 62a-3 and 62b-1 to 62b-3 is found on the basis of the amount of the stroboscopic light emitted from the stroboscope 45 and each of the distances D1, D2, and D3 to the photography subject persons 62. The distance of the reach of the stroboscopic light varies according to the amount of stroboscopic light. Therefore, whether the stroboscopic light reaches each of the photography subject persons 62a-1 to 62a-3 and 62b-1 to 62b-3 can be determined by the amount of the stroboscopic light applied to each of the photography subject persons 62a-1 to 62a-3 and 62b-1 to 62b-3.

The distance distribution information in the three-dimensional photography space is used to determine whether the stroboscopic light reaches each of the photography subject persons 62a-1 to 62a-3 and 62b-1 to 62b-3, so that this determination is obtained as the result of whether the stroboscopic light reaches each of the photography subject persons 62a-1 to 62a-3 and 62b-1 to 62b-3 existing in the three-dimensional photography space.

In other words, in a deep false three-dimensional space as in, for example, a picture expressed in perspective, the amount of the stroboscopic light applied to each of the photography subject persons 62a-1 to 62a-3 and 62b-1 to 62b-3 is found, and on the basis of this stroboscopic light amount, whether or not the stroboscopic light reaches each of the photography subject persons 62a-1 to 62a-3 and 62b-1 to 62b-3 can be determined. In this determination, if, for example, the amount of the stroboscopic light applied to each of the photography subject persons 62a-1 to 62a-3 and 62b-1 to 62b-3 is equal to or less than a preset light amount, it may be determined that the stroboscopic light does not reach the subject.

In the determination using the rules of perspective, if, for example, the size φp of the face of each of the photography subject persons 62a-1 to 62a-3 and 62b-1 to 62b-3 gradually decreases toward the center of the image data, it can be assumed that the photography subject persons 62a-1 to 62a-3 and 62b-1 to 62b-3 are seated in, for example, the room 60 shown in FIG. 7 so that the distances from the main apparatus 1 are in the D1<D2<D3 relationship.

Thus, in the three-dimensional photography space, estimating the far-and-near relationship in accordance with the distance distribution information from the main apparatus 1 to each of the photography subject persons 62a-1 to 62a-3 and 62b-1 to 62b-3 is important in finding the amount of the stroboscopic light applied to each of the photography subject persons 62, for example, as shown in FIG. 4 to FIG. 7.

If the distance distribution information between the main apparatus 1 and the subject including each of the photography subject persons 62a-1 to 62a-3 and 62b-1 to 62b-3 is acquired, it is possible to analogize, by the distance distribution information, the distance to the wall 63 having no contrast and the distance from the main apparatus 1 to the upper surface of the table 61. Since the table 61 is disposed from the near side of the user to the far side, the distance between the upper surface of the table 61 and the main apparatus 1 becomes greater from the near side to the far side.

The presence of the wall 63 having no contrast is not known, but it is possible to determine that the wall 63 is present at a position farther than the position where each of the photography subject persons 62*a*-1 to 62*a*-3 and 62*b*-1 to 62*b*-3 is seated. Here, the distance to the wall 63 having no contrast may be found on the basis of the contrast of a ceiling 65.

The sizes of the glasses 66*a*-1 to 66*a*-3 and 66*b*-1 to 66*b*-3 put on the table 61 gradually decrease on the image data as in the above-mentioned picture expressed in perspective. The distance to each of the glasses 66*a*-1 to 66*a*-3 and 66*b*-1 to 66*b*-3 is found on the basis of the size of each of the glasses 66*a*-1 to 66*a*-3 and 66*b*-1 to 66*b*-3 as each of the distances D1, D2, and D3 is found on the basis of the size φp of the face of each of the photography subject persons 62*a*-1 to 62*a*-3 and 62*b*-1 to 62*b*-3 shown in FIG. 8.

Figure 9:
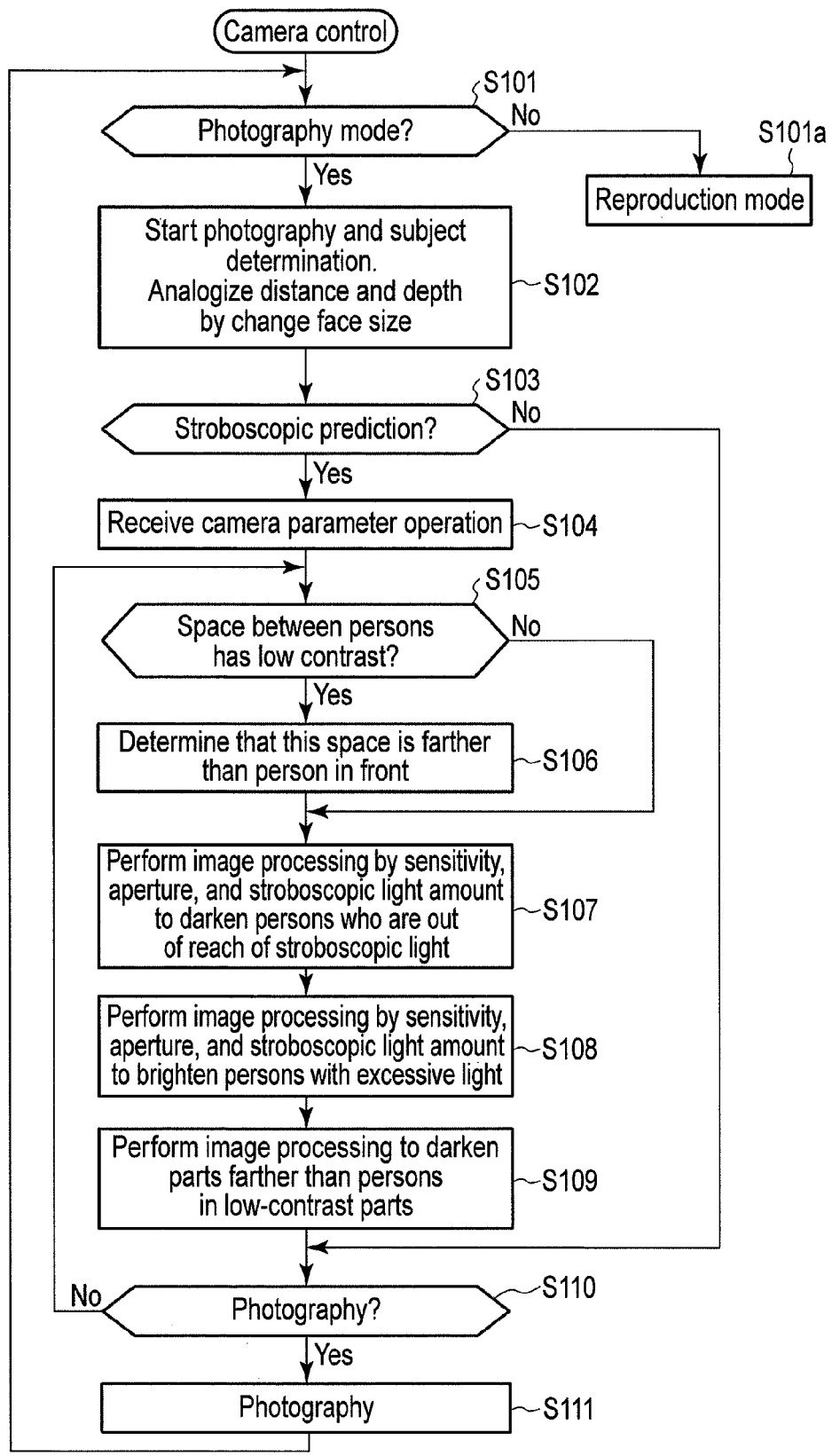
FIG. 9 is a camera control flowchart in the same apparatus.

Now, camera control of the apparatus having the above configuration is described in accordance with a camera control flowchart shown in FIG. 9.

In step S101, the main unit side microcomputer 34 reads the setting of the mode dial of the operation unit 40, and determines whether the mode dial is set to the photography mode. In this case, the main unit side microcomputer 34 may read the setting of the stroboscopic mode switch of the operation unit 40, and determine whether the stroboscopic mode is set.

If it is determined that the photography mode is set, the main unit side microcomputer 34, in step S102, enables the imaging operation of the image pickup device 30 to start the photography of the subject, and also starts the distance measurement of the subject by the distance measurement sensors 30*s*. If the photography mode is not set, the main unit side microcomputer 34 shifts to, for example, the reproduction mode in step S101*a*.

The distance measurement signal, output from the distance measurement sensors 30*s*, is input to the stroboscopic image prediction creation unit 50, and the stroboscopic image prediction creation unit 50 calculates each of the distances D1, D2, and D3 to the photography subject persons 62*a*-1 to 62*a*-3 and 62*b*-1 to 62*b*-3 on the basis of, for example, the distance measurement signal and the change of the size φp of the face of each of the photography subject persons 62*a*-1 to 62*a*-3 and 62*b*-1 to 62*b*-3 shown in FIG. 4.

Specifically, the image pickup device 30 receives the subject image that comes in via the optical lens 21, and converts this subject image to an image signal corresponding to its light amount. The image signal output from the image pickup device 30 is sent to the image processing unit 35, the AE processing unit 36, and the AF processing unit 37 through the analog processing unit 32 and the A/D converter 33.

Each of the distance measurement sensors 30*s* measures the distance to the subject including the main subject, for example, each of the photography subject persons 62*a*-1 to 62*a*-3 and 62*b*-1 to 62*b*-3, and then outputs a distance measurement signal.

The image data, which has been output from the image pickup device 30 and which has been A/D-converted by the A/D converter 33, is input to the image processing unit 35, and the image processing unit 35 performs various kinds of image processing for the image data, such as color correction processing, gamma (γ) correction processing.

The image data which has been subjected to the image processing is sent to the LCD driver 43, and displayed on the display unit 47 as a live view image.

The AE processing unit 36 calculates the luminance of the subject by using the image data which has been output from the image pickup device 30 and which has been A/D-converted by the A/D converter 33, and calculates an aperture amount of the diaphragm 22 at the time of exposure, an exposure time of the image pickup device 30, or the shutter speed of the mechanical shutter in accordance with the luminance.

The AF processing unit 37 causes the focus lens of the optical lens 21 to scan in the direction of the optical axis p. The AF processing unit 37 also detects a peak of the contrast value from the change of the contrast value of the image data which has been output from the image pickup device 30 and which has been A/D-converted by the A/D converter 33, and detects the detected position of the peak as a focus position for the subject.

In step S102, distance measurement signals output from the distance measurement sensors 30*s* are input to the stroboscopic image prediction creation unit 50, and the stroboscopic image prediction creation unit 50 finds distance information to the subject including the main subject from each of the distance measurement signals, and acquires distance distribution information showing the distribution of the distance information.

If the subject to be photographed includes the photography subject persons 62*a*-1 to 62*a*-3 and 62*b*-1 to 62*b*-3 who are seated on both sides of the table 61 disposed in the room 60, for example, in a conference room or a conversation room from the near side to the far side as shown in FIG. 4, the stroboscopic image prediction creation unit 50 calculates each of the distances D1, D2, and D3 (=D) from each of the photography subject persons 62*a*-1 to 62*a*-3 and 62*b*-1 to 62*b*-3 in accordance with Equation (1).

In step S103, the stroboscopic image prediction creation unit 50 determines whether to create a stroboscopic predictive image in advance of stroboscopic photography. In this determination, the stroboscopic image prediction creation unit 50 determines whether the stroboscopic mode is set by the operation of the stroboscopic mode switch of the operation unit 40, and whether the predictive image instruction switch is operated.

If the predictive image instruction switch is operated, the stroboscopic image prediction creation unit 50, in step S104, reads internal parameters of the camera set in the main apparatus 1.

In step S105, the stroboscopic image prediction creation unit 50 determines whether the spaces between the photography subject persons 62*a*-1 to 62*a*-3 and 62*b*-1 to 62*b*-3 have low contrast, for example, as shown in FIG. 4.

If it is determined that the spaces between the photography subject persons 62*a*-1 to 62*a*-3 and 62*b*-1 to 62*b*-3 have low contrast, the stroboscopic image prediction creation unit 50 determines, in step S106, the distance of each of the spaces between the photography subject persons 62*a*-1 to 62*a*-3 and 62*b*-1 to 62*b*-3. For example, the stroboscopic image prediction creation unit 50 determines that the space between the photography subject persons 62*a*-1 and 62*a*-2 is farther than the photography subject person 62*a*-1. The stroboscopic image prediction creation unit 50 determines that the space between the photography subject persons 62*a*-2 and 62*a*-3 is farther than the photography subject person 62*a*-2. Moreover, the stroboscopic image prediction creation unit 50 determines that the space between the photography subject person 62*a*-3 and the wall 63 is farther than the photography subject person 62*a*-3. As a result of these determinations, the far-and-near relationships of the spaces between the photography subject persons 62*a*-1 to 62*a*-3 and 62*b*-1 to 62*b*-3 are determined in the three-dimensional photography space.

This determination of the far-and-near relationship in the three-dimensional photography space is an important feature of the present embodiment. Each of the distances D1, D2, and D3 to the face of the photography subject persons 62*a*-1 to 62*a*-3 and 62*b*-1 to 62*b*-3 may be found on the basis of the distance measurement signals output from the distance measurement sensors 30*s*.

The wall 63 having no contrast can be determined to exist at a position farther than the distance of the seating position of each of the photography subject persons 62*a*-1 to 62*a*-3 and 62*b*-1 to 62*b*-3 on the basis of the far-and-near relationship. The distance to the wall 63 having no contrast may be found on the basis of the contrast of the ceiling 65.

If each of the distances D1, D2, and D3 to the photography subject persons 62*a*-1 to 62*a*-3 and 62*b*-1 to 62*b*-3 is found, whether the stroboscopic light reaches each of the photography subject persons 62*a*-1 to 62*a*-3 and 62*b*-1 to 62*b*-3 can be determined. In a similar manner, if the distance to the wall 63 having no contrast is found, whether the stroboscopic light reaches the wall 63 can also be determined. Whether the stroboscopic light reaches is determined by finding the amount of the stroboscopic light applied to each of the photography subject persons 62*a*-1 to 62*a*-3 and 62*b*-1 to 62*b*-3 and the wall 63 on the basis of the amount of the stroboscopic light emitted from the stroboscope 45 and each of the distances D1, D2, and D3 to the photography subject persons 62. If, for example, the amount of the stroboscopic light applied to each of the photography subject persons 62*a*-1 to 62*a*-3 and 62*b*-1 to 62*b*-3 and the wall 63 is equal to or less than the preset light amount, it may be determined that the stroboscopic light does not reach the subject persons.

The face of each of the photography subject persons 62*a*-1 to 62*a*-3 and 62*b*-1 to 62*b*-3 is detected by the face detection unit 35*a*. Since each of the distances D1, D2, and D3 (=D) from each of the photography subject persons 62*a*-1 to 62*a*-3 and 62*b*-1 to 62*b*-3 is calculated in accordance with Equation (1), the distance to the face of each of the photography subject persons 62*a*-1 to 62*a*-3 and 62*b*-1 to 62*b*-3 is also estimated substantially in the same manner as each of the distances D1, D2, and D3 (=D).

For example the hair and the rest of the person's body are located within a predetermined range around the face of each of the photography subject persons 62*a*-1 to 62*a*-3 and 62*b*-1 to 62*b*-3. If the face of each of the photography subject persons 62*a*-1 to 62*a*-3 and 62*b*-1 to 62*b*-3 is detected by the face detection unit 35*a*, each of the distances D1, D2, and D3 (=D) to the photography subject persons 62*a*-1 to 62*a*-3 and 62*b*-1 to 62*b*-3 can be calculated even with the presence of the person's hair and the rest of their body. That is, each of the photography subject persons 62*a*-1 to 62*a*-3 and 62*b*-1 to 62*b*-3 may be considered as including their face, hair, and body, and considered as existing at the same distance from the main apparatus 1.

The outline determination unit 35*b* determines, for example, the outline of each of the photography subject persons 62*a*-1 to 62*a*-3 and 62*b*-1 to 62*b*-3. The outline determination unit 35*b* also determines the outline of each of the glasses 66*a*-1 to 66*a*-3 and 66*b*-1 to 66*b*-3.

Each region surrounded by the outline of each of the photography subject persons 62*a*-1 to 62*a*-3 and 62*b*-1 to 62*b*-3 is determined to have the same distance from the main apparatus 1. Each region surrounded by the outline of each of the glasses 66*a*-1 to 66*a*-3 and 66*b*-1 to 66*b*-3 is also determined to have the same distance from the main apparatus 1.

The use of the main apparatus 1 enables even the simulation of how the top of the table 61 shines. In this case, the distance from the main apparatus 1 to the top of the table 61 is matched to each of the distances D1, D2, and D3 (=D) from each of the photography subject persons 62*a*-1 to 62*a*-3 and 62*b*-1 to 62*b*-3. Thus, if there is a part having no contrast on the table 61, the photography subject persons 62*a*-1 through 62*b*-3 at the position corresponding to the position of the part having no contrast is detected, and the distance D1 of, for example, the detected photography subject person 62*a*-1 is estimated as the distance D1 of the part having no contrast. If the distance D1 of the part having no contrast is estimated, the amount of the stroboscopic light applied to the top of the table 61 is found on the basis of the distance D1 and the amount of the stroboscopic light emitted from the stroboscope 45, and how the top of the table 61 shines can be simulated from the stroboscopic light amount.

Thus, the distance D from the main apparatus 1 can also be estimated on the basis of the three-dimensional distance distribution information for parts which do not allow the measurement of distance, such as a predetermined range around the face of each of the photography subject persons 62*a*-1 to 62*a*-3 and 62*b*-1 to 62*b*-3, and parts having no contrast on the table 61.

The region dividing unit 35*c* detects points having the same distance on the image data on the basis of the distance distribution information in the three-dimensional photography space and the distance information estimated for parts which do not allow distance measurement such as parts having no contrast. The region dividing unit 35*c* detects the positions of the detected points along the outer circumference of the set of the points, and divides the region surrounded by the detected coordinate points as region information having the same distance.

In step S107, the stroboscopic image prediction creation unit 50 determines whether the stroboscopic light reaches each of the photography subject persons 62*a*-1 to 62*a*-3 and 62*b*-1 to 62*b*-3 on the basis of the distance D1, D2, or D3 (=D) from the calculated photography subject person 62 and the reachable distance of the stroboscopic light corresponding to the stroboscopic light amount.

As a result of the determination, the stroboscopic image prediction creation unit 50 performs image processing for darkening by decreasing the luminance of the farther part of the subject to which the stroboscopic light does not reach. That is, the stroboscopic image prediction creation unit 50 finds the traveling distance of stroboscopic light on the basis of the distance distribution information showing the distance between the subject and the main apparatus 1 and the amount of the stroboscopic light emitted from the stroboscope 45 at the time of the stroboscopic photography, and predicts the brightness of the subject on the basis of the traveling distance of the stroboscopic light and then predicts a stroboscopic predictive image.

Specifically, if the amount of stroboscopic light emitted from the stroboscope 45 is preset, the stroboscopic image prediction creation unit 50 acquires the amount of stroboscopic light to be applied to each of the photography subject persons 62*a*-1 to 62*a*-3 and 62*b*-1 to 62*b*-3 in accordance with the stroboscopic light amount and each of the distances D1, D2, and D3 between the main apparatus 1 and each of the photography subject persons 62*a*-1 to 62*a*-3 and 62*b*-1 to 62*b*-3. The stroboscopic image prediction creation unit 50 finds the luminance of each of the photography subject persons 62a-1 to 62a-3 and 62b-1 to 62b-3 on the basis of the amount of stroboscopic light to be applied to each of the photography subject persons 62a-1 to 62a-3 and 62b-1 to 62b-3, and creates a stroboscopic predictive image including each of the photography subject persons 62a-1 to 62a-3 and 62b-1 to 62b-3 having the above luminance.

Accordingly, in step S108, the stroboscopic image prediction creation unit 50 performs image processing for brightening to increase luminance by a predetermined value in the near parts of the subject where the stroboscopic light reaches, in the parts where the amount of the stroboscopic light applied to the subject by, for example, stroboscopic photography is equal to or more than a set amount, and in the face of each of the photography subject persons 62a-1 to 62a-3 and 62b-1 to 62b-3 to which the stroboscopic light is applied.

In step S109, the stroboscopic image prediction creation unit 50 performs image processing to darken, for example, low-contrast parts between the photography subject persons 62a-1 to 62a-3 and 62b-1 to 62b-3, that is, image processing to decrease luminance by a predetermined value.

As a result, the stroboscopic image prediction creation unit 50 creates, for example, the stroboscopic predictive image E1 shown in FIG. 5 for the photography of the subject image IM1 with the stroboscope. The stroboscopic predictive image E1 is a dark image having low luminance because the stroboscopic light emitted from the stroboscope 45 has not reached, for example, the photography subject persons 62a-3 and 62b-3 seated on the far side and the wall 63. The stroboscopic predictive image E1 is displayed on the display unit 47 driven by the LCD driver 43.

In step S110, the main unit side microcomputer 34 determines whether the 1st release switch of the release button has been turned on. When it is determined that the 1st release switch has been turned on, the main unit side microcomputer 34 instructs the AF processing unit 37 to perform a photography preparation operation such as AF processing. If the 2nd release switch has been turned on, the main unit side microcomputer 34 instructs the AE processing unit 36 to perform an exposure operation for still image photography.

As a result, in step S111, the main unit side microcomputer 34 performs the photography of the subject.

Thus, according to the first embodiment described above, the distance distribution information relative to the subject is acquired in advance of stroboscopic photography based on the distance to each of the photography subject persons 62a-1 to 62a-3 and 62b-1 to 62b-3 included in the subject whose distances have been measured by the distance measurement sensors 30s. On the basis of this distance distribution information, the stroboscopic predictive image E1 for stroboscopic photography is created. Therefore, it is possible to predict an accurate flash image in which the brightness of the subject at the time of stroboscopic photography is predicted in advance of stroboscopic photography, display this stroboscopic predictive image, and precisely assist the user in the stroboscopic photography.

For example, the stroboscopic light emitted from the stroboscope 45 does not reach the photography subject persons 62a-3 and 62b-3 seated on the far side and the wall 63, and the stroboscopic predictive image E1 having low luminance is predicted as shown in FIG. 5. Even in this case, by increasing the light amount in the stroboscope 45, decreasing the aperture amount of the diaphragm 22, and increasing sensitivity as shown in FIG. 6, it is possible to have a brighter photographic image in which the stroboscope light reaches the photography subject persons 62a-3 and 62b-3 seated on the far side and the wall 63 and in which the luminance is increased by a predetermined value.

In the AF, as described above, at the time of the acquisition of the change of the contrast value, there may be a region having no contrast, and the distance information regarding this region may be not known.

Regarding the region having no contrast, it is possible to obtain distance information by determining the distance information, the photography space, or the far-and-near relationship obtained according to the present embodiment even if the distance information is not known. When the distance information is obtained in this way, the result of the face detection, the result of the outline determination, and the result of the region division may be used together.

[Second Embodiment]

Next, a second embodiment of the present invention is described with reference to the drawings. FIG. 2 and FIG. 3 are used together to describe the difference between the main apparatus 1 and the former apparatus 1.

The stroboscopic image prediction creation unit 50 performs image processing to brighten a region in the subject to which stroboscopic light is applied at the time of daylight synchro mode photography. In this image processing, the luminance of the subject is increased by a predetermined value in accordance with the amount of stroboscopic light applied to the subject.

FIG. 10 shows an appearance diagram of the main apparatus 1. The main apparatus 1 is provided with a daylight synchro mode button 60. The daylight synchro mode button 60 is provided, for example, in the front surface of the main apparatus 1. The daylight synchro mode button 60 is provided in a location such as the operation unit 40 where the release button L is pressed by the forefinger F and the daylight synchro mode button 60 is pressed by a middle finger when the main apparatus 1 is held by the right hand H1 of the user.

FIG. 11 shows an example of a subject image IM2 photographed in daylight synchro mode. In the subject image IM2, the photography subject persons 62 are seated from the near side to the far side across the table 61, as in the room 60, for example, a conference room or a conversation room shown in FIG. 4. The subject image IM2 is taken against the sun SU in front of the main apparatus 1. Thus, the subject image IM2 is a dark photographic image in which each of the photography subject persons 62a-1 to 62a-3 and 62b-1 to 62b-3 has low luminance.

FIG. 12 shows an example of a stroboscopic predictive image E2 created in advance of daylight synchro mode stroboscopic photography. In the stroboscopic predictive image E2, the region of the subject including the photography subject persons 62a-1 to 62a-3 and 62b-1 to 62b-3 which stroboscopic light is applied, for example, the face of each of the photography subject persons 62a-1 to 62a-3 and 62b-1 to 62b-3 is brightened, that is, the luminance is increased by a predetermined value in accordance with the amount of stroboscopic light applied to the face of each of the photography subject persons 62a-1 to 62a-3 and 62b-1 to 62b-3, at the time of daylight synchro mode photography.

Figure 13:
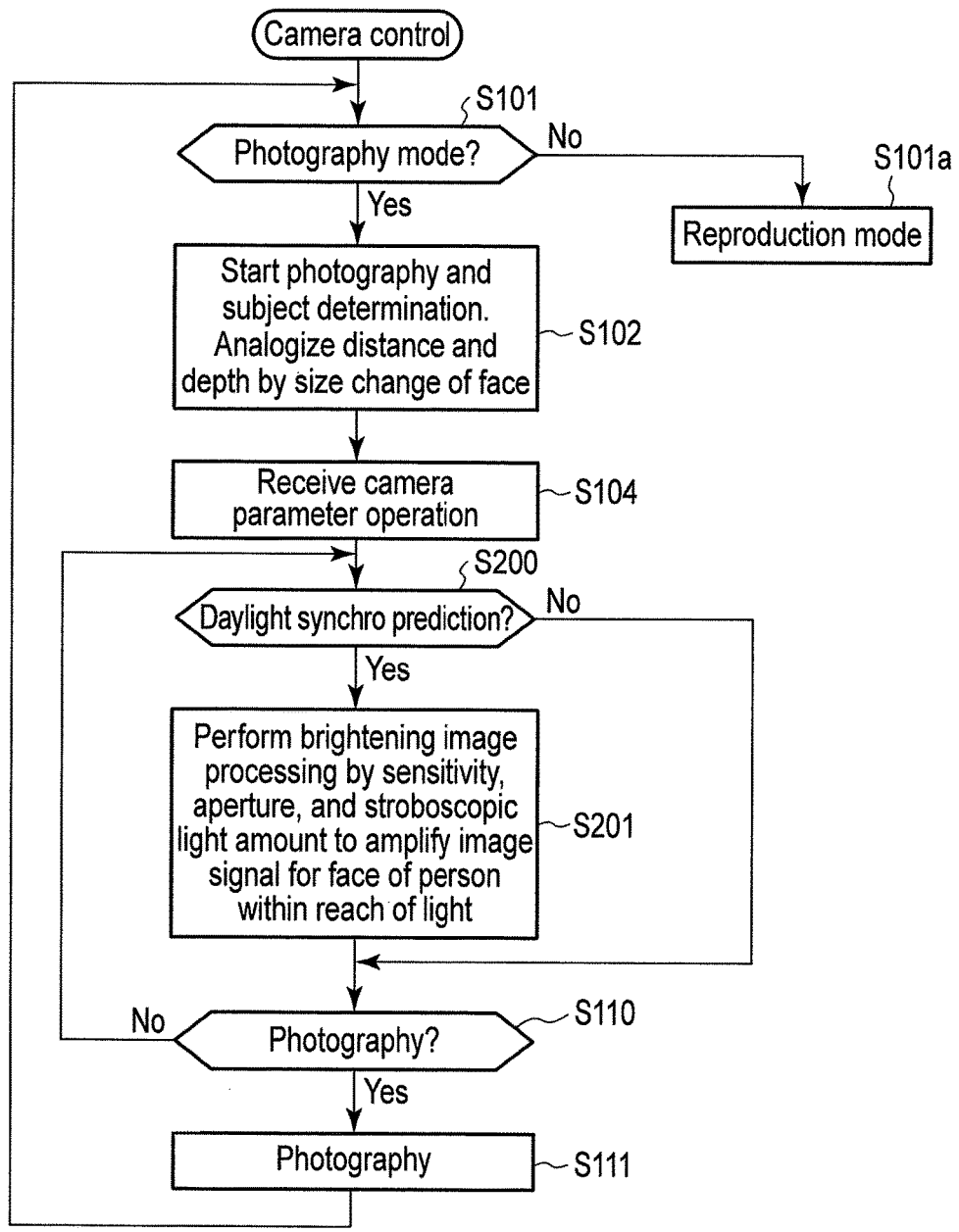
FIG. 13 is a camera control flowchart for stroboscopic photography in the daylight synchro mode by the same apparatus.

Next, camera control of the apparatus 1 having the above configuration is described in accordance with a camera control flowchart shown in FIG. 13.

In step S200, the stroboscopic image prediction creation unit 50 reads the setting of the daylight synchro mode button 60 of the operation unit 40, and determines whether the daylight synchro mode button 60 is set to a daylight synchro mode.

When it is determined that the daylight synchro mode button 60 is set to the daylight synchro mode, the stroboscopic image prediction creation unit 50, in step S201, performs image processing to brighten the region in the subject to which stroboscopic light is applied, that is, to increase luminance by a predetermined value in accordance with the amount of stroboscopic light applied to the subject, in advance of daylight synchro mode photography. For example, as shown in FIG. 12, the stroboscopic image prediction creation unit 50 creates, in advance of daylight synchro mode stroboscopic photography, the stroboscopic predictive image E2 by image processing to previously brighten the region to which stroboscopic light is applied, for example, the face of each of the photography subject persons 62a-1, 62b-1, 62b-1, and 62b-2, that is, by image processing to increase the luminance of the face by a predetermined value.

Thus, according to the second embodiment described above, the brightening image processing is performed at the time of daylight synchro mode photography by increasing, by the predetermined value, the luminance of the region in the subject to which stroboscopic light is applied. Therefore, at the time of daylight synchro mode photography as well, it is possible to predict an accurate flash image in which the brightness of the subject at the time of stroboscopic photography is predicted in advance of stroboscopic photography, display this stroboscopic predictive image, and precisely assist the user in the stroboscopic photography, as in the previously described first embodiment.

[Third Embodiment]

Now, a third embodiment of the present invention is described with reference to the drawings. The configuration of the main apparatus 1 is the same as the configuration shown in FIG. 2, and the differences therebetween are described.

The image pickup device 30 includes phase contrast pixels as described above. The AF for the subject and the distance from the main apparatus 1 to the subject can be acquired from the difference of output signals of the phase contrast pixels in the image pickup device 30.

The stroboscopic image prediction creation unit 50 compares the distance from the subject acquired from the difference of the output signals of the phase contrast pixels in the image pickup device 30 with the traveling distance of stroboscopic light corresponding to the guide number of the stroboscope 45. If the distance from the subject is different from the traveling distance of the stroboscopic light, the stroboscopic image prediction creation unit 50 performs image processing adapted to the traveling distance of the stroboscopic light. In this image processing, a stroboscopic predictive image is created, for example, by decreasing the luminance of the farther parts of the subject, brightening the nearer parts of the subject, and brightening the parts of the subject within reach of the stroboscopic light. This stroboscopic predictive image is displayed on the display unit 47 as a live view image.

As described above, for the far side and the near side, for example, a reference distance from the main apparatus 1 is set, and the sides far from and near the main apparatus 1 with respect to the reference distance are set. On the farther side, image processing is performed to decrease luminance by a predetermined value in accordance with the increasing distance. On the nearer side, image processing may be performed to increase luminance by a predetermined value in accordance with the decreasing distance.

Figure 14:
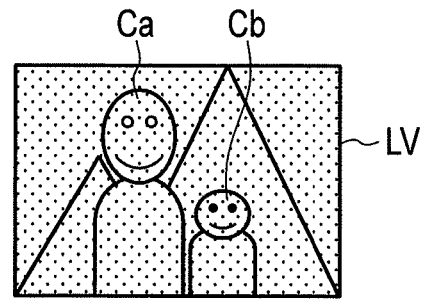
FIG. 14 is a diagram showing an example of a live view image displayed by a third embodiment of an imaging apparatus according to the present invention.

FIG. 14 shows an example of a live view image (live view original image) LV before prediction by the stroboscopic image prediction creation unit 50. The live view image LV includes main subjects Ca and Cb such as persons, and is a dark image without the emission of stroboscopic light.

Figure 15:
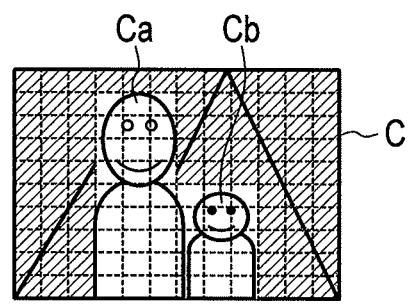
FIG. 15 is a diagram showing image processing corresponding to the result of comparison of the distance from the subject and the traveling distance of stroboscopic light corresponding to a guide number in the same apparatus.

FIG. 15 shows the comparison between the distance from the subject acquired from the difference of the output signals of the phase contrast pixels in the image pickup device 30 and the traveling distance of the stroboscopic light corresponding to the guide number of the stroboscope 45. A comparative image C is brighter by predetermined luminance because the stroboscopic light is applied to the main subjects including, for example, persons in the subject. Since the main subjects Ca and Cb including persons are located within reach of the stroboscopic light, the stroboscopic light is applied to the main subjects Ca and Cb.

Figure 16:
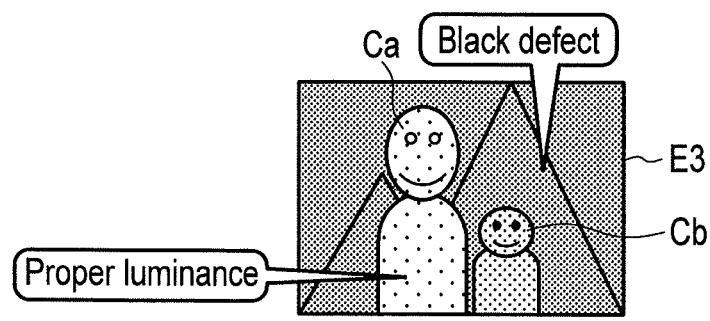
FIG. 16 is a diagram showing an example of how to display, as a live view image, a stroboscopic predictive image created by the same apparatus.

FIG. 16 shows an example of a stroboscopic predictive image E3 displayed on the display unit 47 as a live view image. The luminance of the stroboscopic predictive image E3 is adjusted so that the amount of the stroboscopic light applied to the main subjects/persons, etc., Ca and Cb will be proper, and the luminance of the parts of the subject farther than the main subjects/persons, etc., Ca and Cb is decreased. The proper luminance of the main subjects/persons, etc., Ca and Cb may be preset or may be set to a desired luminance by the user every time photography takes place.

Thus, according to the third embodiment described above, the distance from the subject acquired from the difference of the output signals of the phase contrast pixels in the image pickup device 30 is compared with the traveling distance of the stroboscopic light corresponding to the guide number of the stroboscope 45. The stroboscopic predictive image is created by the image processing adapted to the traveling distance of the stroboscopic light. Therefore, it is possible to predict and display an accurate flash image in advance of stroboscopic photography, and precisely assist the stroboscopic photography.

[Fourth Embodiment]

Now, a fourth embodiment of the present invention is described with reference to the drawings. The same parts as those in FIG. 2 and FIG. 3 are provided with the same signs and are not described in detail.

Figure 17:
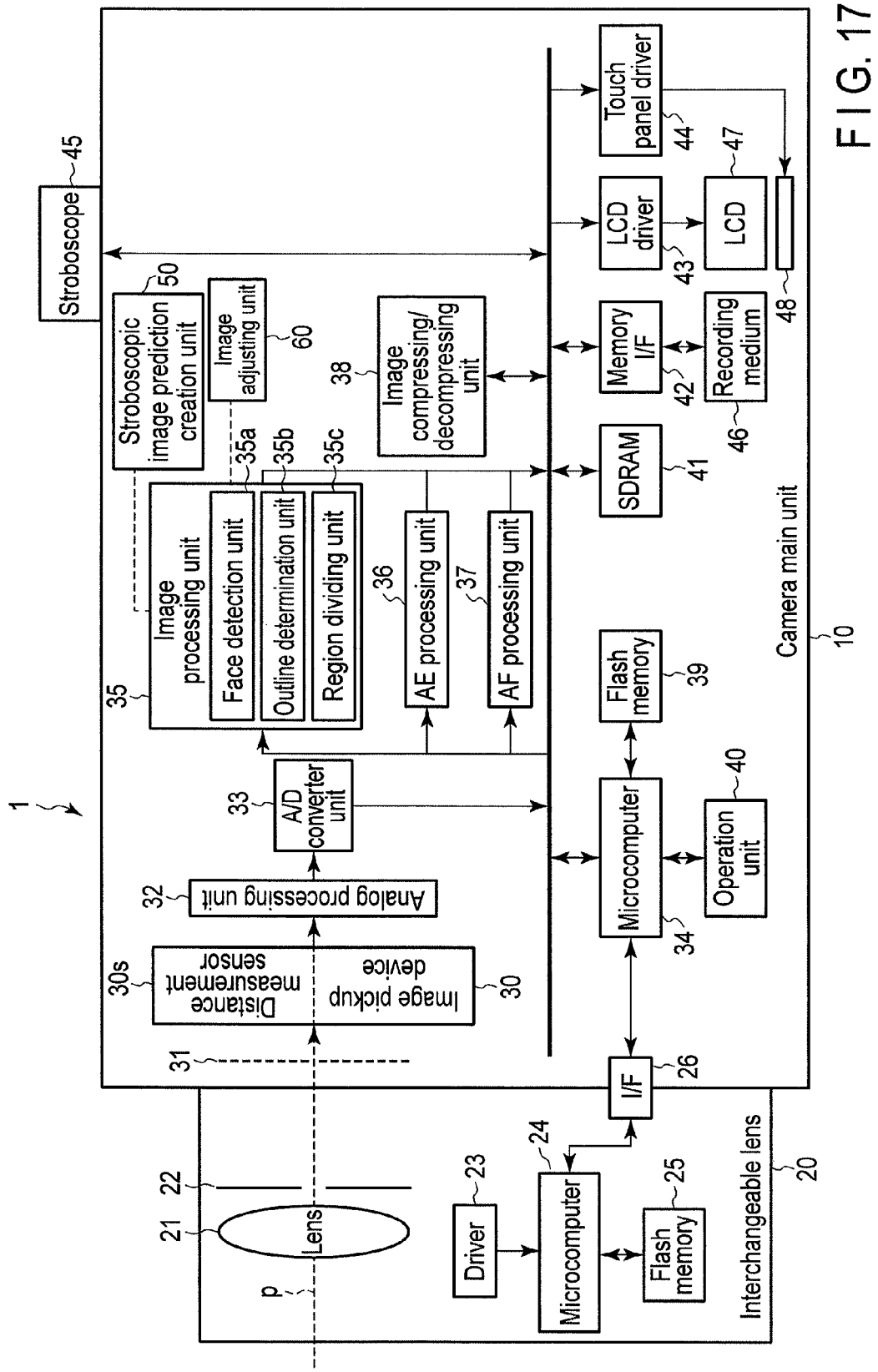
FIG. 17 is a detailed configuration diagram showing a fourth embodiment of an imaging apparatus according to the present invention.

FIG. 17 shows a detailed configuration diagram of the main apparatus 1. The image processing unit 35 includes an image adjusting unit 60. The image adjusting unit 60 determines whether the finger of the user has touched the touch panel 48 as shown in FIG. 18. If it is determined that the finger of the user has touched the touch panel 48, the image adjusting unit 60 determines the part of the live view image displayed on the display unit 47 corresponding to the touch coordinates where the finger of the user has touched. Specifically, the image adjusting unit 60 determines a desired region in the live view image including the touch coordinates, changes the guide number for the desired region to change the amount of the stroboscopic light, and properly adjusts the brightness of the desired region in accordance with the change of the amount of the stroboscopic light.

The guide number represents the amount of the stroboscopic light of the stroboscope 45. There is a predetermined relationship among the guide number, the distance to the subject, the aperture, and the sensitivity. The aperture amount of the diaphragm 22 associated with exposure can be found by this relationship.

Figure 18A:
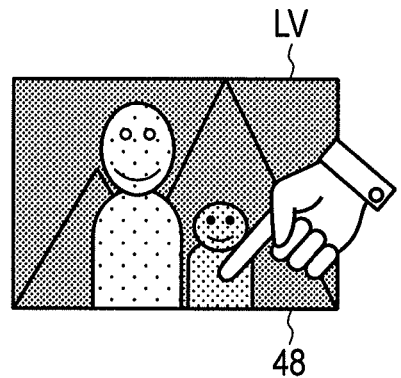
FIG. 18A is a diagram showing a touch on a live view image displayed on an LCD in the same apparatus.
Figure 18B:
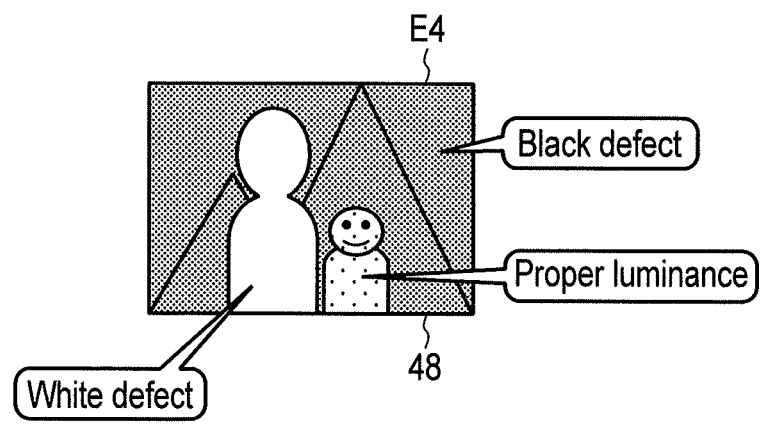
FIG. 18B is a diagram showing a live view image in which brightness has been properly adjusted by changing a guide number provided by an image adjusting unit of the same apparatus.

FIG. 18A shows a touch on the live view image LV displayed on the display unit 47. FIG. 18B shows a live view image E4 in which the brightness has been properly adjusted by changing the guide number. The live view image E4 may be a stroboscopic predictive image. The live view image E4 is adjusted to the luminance that is proper for the main subject including the touch coordinates, for example, preset luminance or desired luminance set by the user every time photography takes place.

If there is a region from which the distance information relative to the subject is not acquired, the stroboscopic image prediction creation unit 50 acquires the distance information by regarding the already acquired distance information as distance information of this region.

The stroboscopic image prediction creation unit 50 creates the stroboscopic predictive image in which the brightness has been changed in accordance with each distance from the subject conforming to the interpolated distance distribution information.

Figure 19:
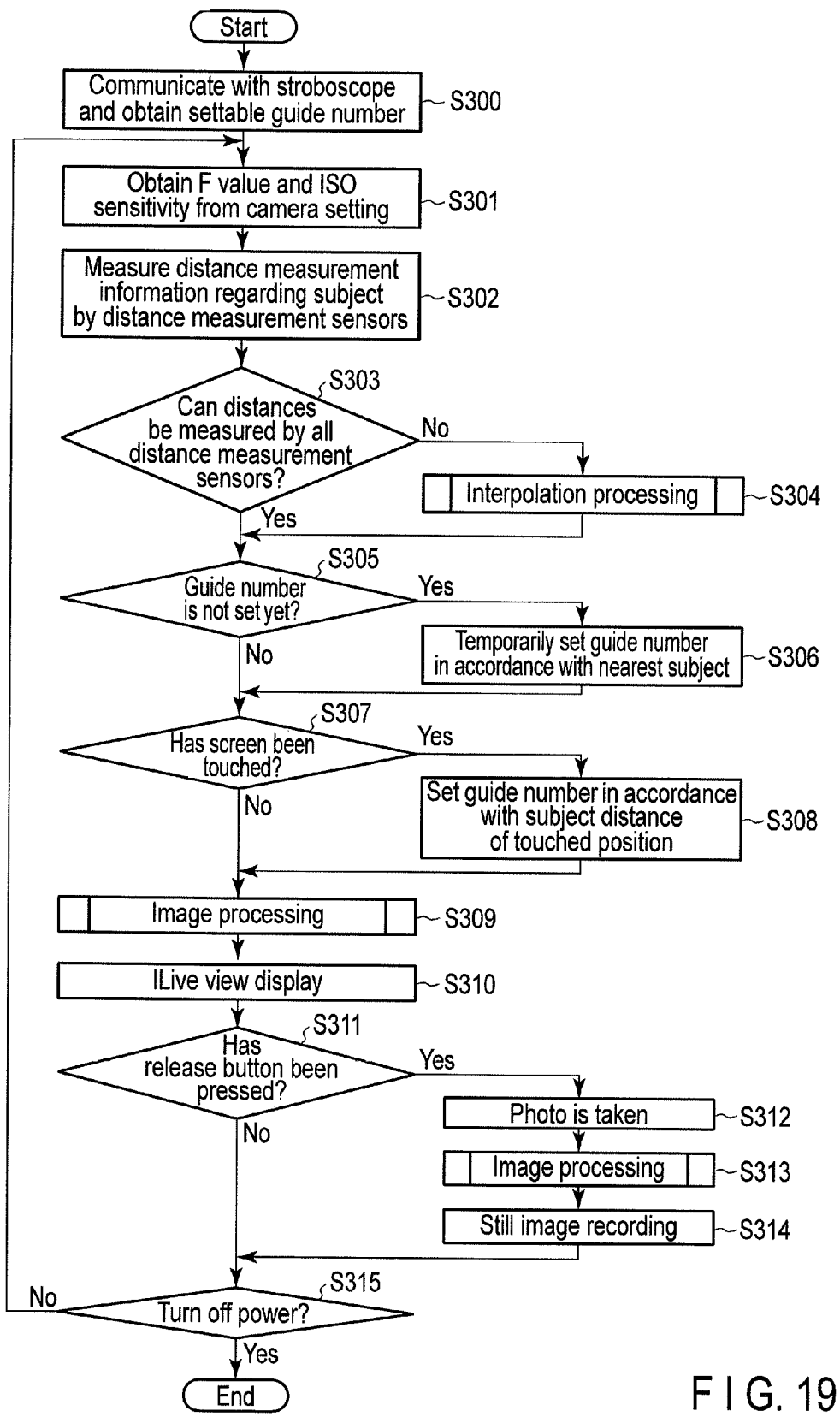
FIG. 19 is a camera control flowchart in the same apparatus.

Now, camera control of the main apparatus 1 having the above configuration is described in accordance with a camera control flowchart shown in FIG. 19.

The image pickup device 30 receives the subject image that comes in via the optical lens 21, and converts this subject image to an image signal corresponding to its light amount. The image processing unit 35 performs various kinds of image processing for the image signal output from the image pickup device 30, such as color correction processing, gamma (γ) correction processing. The main unit side microcomputer 34 performs AE processing and AF processing for the image data output from the image processing unit 35, and displays the image data as a live view image on the display unit 47 via the LCD driver 43.

Each of the distance measurement sensors 30s measures the distance to the main subject included in the subject, and outputs the distance measurement signal.

In step S300, the main unit side microcomputer 34 performs data communication with the stroboscope 45, and determines a guide number settable to the stroboscope 45.

In step S301, the main unit side microcomputer 34 acquires an F value and ISO value sensitivity from the setting of the main apparatus 1.

In step S302, distance measurement signals output from the distance measurement sensors 30s are input to the main unit side microcomputer 34, and the main unit side microcomputer 34 acquires each piece of distance information to the subject from each of the distance measurement signals.

In step S303, the main unit side microcomputer 34 determines whether the distance information has been acquired from all of the distance measurement sensors 30s in accordance with the distance measurement signals respectively output from the distance measurement sensors 30s. The presence of the distance measurement sensors 30s from which the distance information cannot be acquired means the presence of the regions of the subject where the distance information cannot be acquired.

If it is determined that the distance information cannot be acquired from all the distance measurement sensors 30s, the main unit side microcomputer 34, in step S304, performs interpolation processing for the distance measurement sensors 30s from which the distance information cannot be acquired.

After acquiring the distance information relative to all the distance measurement sensors 30s or after performing the interpolation processing for the distance measurement sensors 30s from which the distance information cannot be acquired, the main unit side microcomputer 34 determines in step S305 whether the guide number is unset.

If it is determined that the guide number is unset, the main unit side microcomputer 34, in step S306, temporarily sets a guide number in accordance with the subject having the shortest distance among the subjects in the live view image.

If the guide number is not unset or if the guide number is temporarily set, the image adjusting unit 60 determines in step S307 whether a contact signal output from the touch panel 48 is input, and the image adjusting unit 60 thereby determines whether the finger of the user has touched the touch panel 48 on the screen of the display unit 47.

When it is determined that the finger of the user has touched the touch panel 48, the image adjusting unit 60, in step S308, finds touch coordinates from the contact signal output from the touch panel 48, and determines the part of the live view image displayed on the display unit 47 corresponding to the touch coordinates, that is, a desired region in the live view image including the touch coordinates.

In step S309, the image adjusting unit 60 acquires the distance information for the desired region in the live view image from the distance measurement signal output from the distance measurement sensors 30s, changes and sets the guide number in accordance with the distance information, and adjusts the brightness of the desired region including the touch coordinates to proper brightness.

In step S310, the image adjusting unit 60 displays the live view image in which the brightness of the desired region including the touch coordinates has been adjusted on the display unit 47 via the LCD driver 43.

In step S311, the main unit side microcomputer 34 determines whether the release button has been pressed halfway and then fully pressed. If it is determined that the release button has been pressed halfway and then fully pressed, the main unit side microcomputer 34, in step S312, performs exposure processing including, for example, AF processing, AE processing, and aperture adjustment, and then phonographs the subject. In step S313, the main unit side microcomputer 34 performs image processing of the electric signal output from the image pickup device 30 to acquire still image data. In step S314, the main unit side microcomputer 34 displays the image data on the display unit 47.

The main unit side microcomputer 34 determines in step S315 whether the electric power is turned off. If the electric power is not turned off, the main unit side microcomputer 34 returns to step S301. If the electric power is turned off, the main unit side microcomputer 34 finishes the operation of the main apparatus 1.

Figure 20:
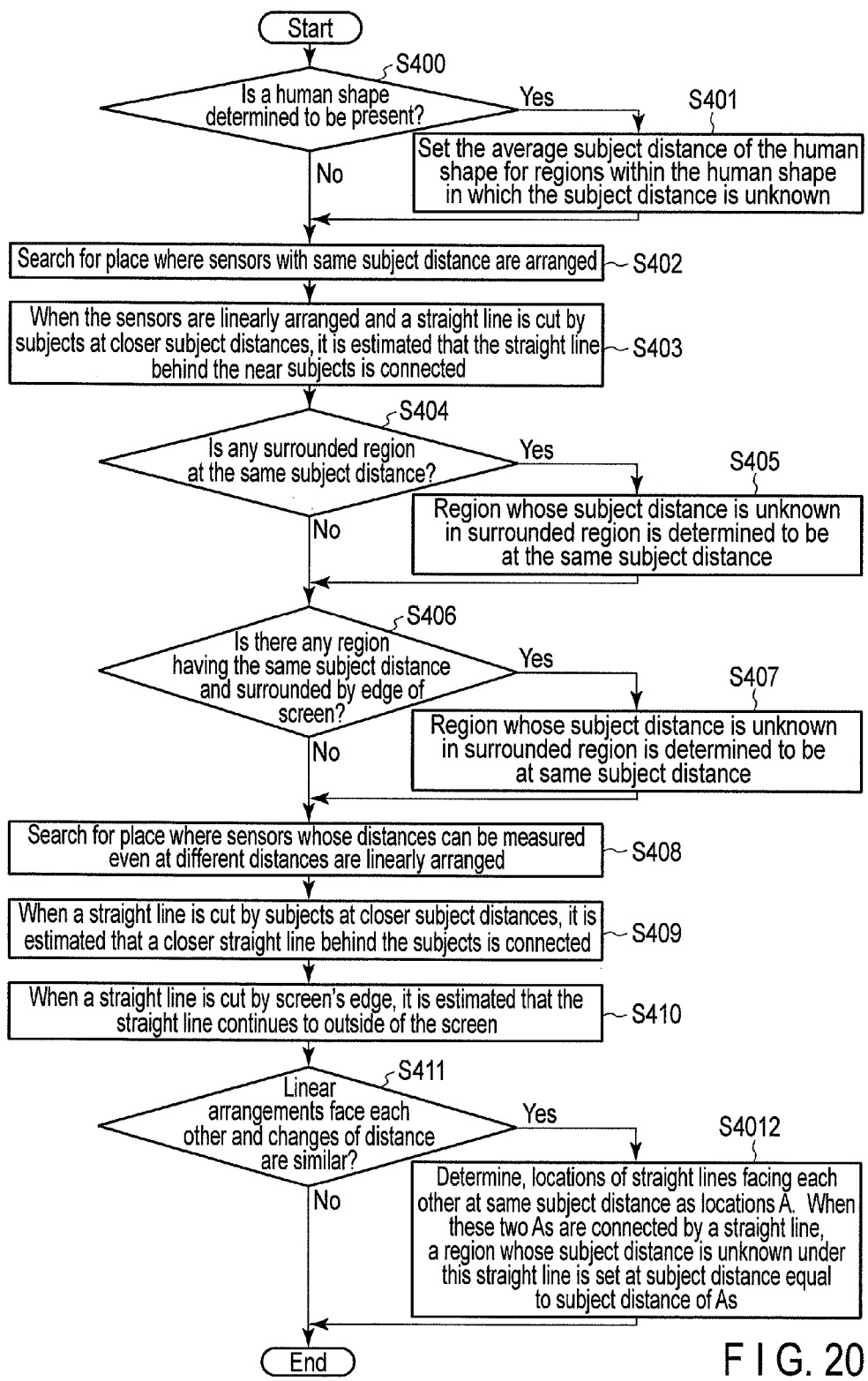
FIG. 20 is an interpolation processing flowchart in the same apparatus.

Now, the interpolation processing (step S304) is described in accordance with an interpolation processing flowchart shown in FIG. 20.

In step S400, the main unit side microcomputer 34 determines whether there is any main subject (hereinafter referred to as a human shape) H such as a person in the live view image LV. A human-shaped pattern formed into, for example, a human shape is used to determine the presence of the human shape H, and an image region similar to the human-shaped pattern is detected from the live view image LV. FIG. 21 shows that two human shapes H are detected from the live view image LV.

If the human shapes H are detected, the main unit side microcomputer 34, in step S401, finds the distance from each of the human shapes H from the distance measurement signal output from each of the distance measurement sensors 30s. In this case, if there is any region whose distance is unknown in each of the human shapes H, the main unit side microcomputer 34 treats the distance of this region whose distance is unknown as an average distance from the human shape H.

Figure 22C:
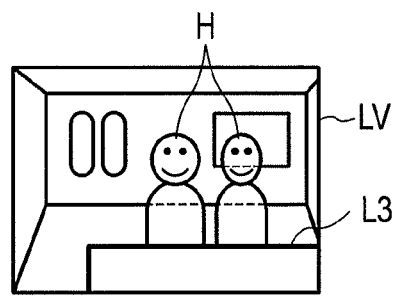
FIG. 22C is a diagram showing an example of a line part in which the pieces of distance information detected by the same apparatus are arranged at the same, distance.

In step S402, distance measurement signals output from the distance measurement sensors 30s are input to the main unit side microcomputer 34, and the main unit side microcomputer 34 detects a location (hereinafter referred to as a line location) where pieces of distance information having the same distance are arranged. If the main unit side microcomputer 34 detects the line locations as a result of the above detection of the line location, the main unit side microcomputer 34 determines whether there is, for example, a quadrate surrounded shape in which the line locations are connected. For example, FIGS. 22A to 22C show an example of line locations L1, L2, L3 and L4. In FIG. 22A, each borderline of the walls in the room is detected as the line location L1. This line location L1 has a rectangular shape. In FIG. 22B, a window frame provided in the room is detected as the line location L2. This line location L2 also has a rectangular shape. In FIG. 22B, a window frame provided in the room is detected as a line location L4. The line location L4 is a combination of straight parts and curved parts. This line location L4 includes the curved parts, but if the ratio of the straight parts is equal to or more than the predetermined ratio, the straight parts are detected to be included in the line location. In FIG. 22C, a table existing before the human shape H is detected as the line location L3. This line location L3 has a rectangular shape, but is partly regulated by the frame of the live view image LV.

In step S403, the main unit side microcomputer 34 determines whether the detection result of each of the line locations L1, L2, and L3 is cut by the human shape H. For example, the line location L1 in FIG. 22A is cut by the human shape H. The line location L2 in FIG. 22B is cut by the human shape H.

Therefore, the main unit side microcomputer 34 determines that the line locations L1 and L2 cut halfway by the human shape H as shown in FIG. 22A and FIG. 22B are present farther from the main apparatus 1 than the human shape H, and the main unit side microcomputer 34 estimates that the line locations L1 and L2 are connected behind of the human shape H. FIGS. 22A to 22C show parts of the live view image LV. In the live view image LV, there are line locations in addition to the line locations L1, L2, and L3, and there are places where these line locations are cut by, for example, the human shape H. However, these places are not described.

Figure 23A:
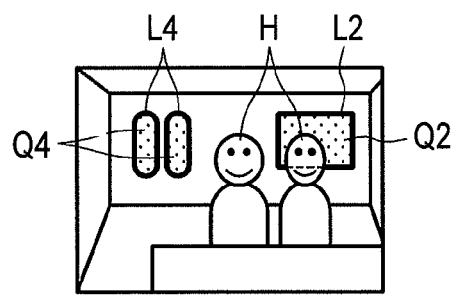
FIG. 23A is a diagram showing a region whose distance detected by the same apparatus is the same and which is surrounded by a line part.
Figure 23B:
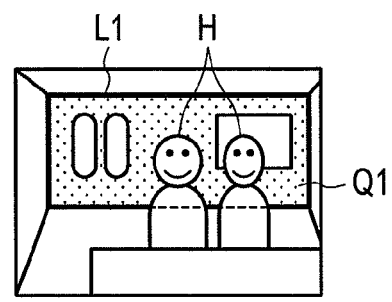
FIG. 23B is a diagram showing the region whose distance detected by the same apparatus is the same and which is surrounded by the line part.

In step S404, the main unit side microcomputer 34 detects regions Q1, Q2, Q3, and Q4 surrounded by the detected line locations L1, L2, L3, and L4, and the main unit side microcomputer 34 determines whether there are any regions having the same distance among the regions Q1, Q2, Q3, and Q4. For example, as shown in FIG. 23A, the regions Q2 and Q4 surrounded by the line locations L2 and L4 are windows, and the distances to the regions Q2 and Q4 are the same. As shown in FIG. 23B, each region Q1 surrounded by the line location L1 is, for example, a far-side wall in the room, and the distance to the region Q1 is also the same as the distances to the regions Q2 and Q4.

Thus, if the regions Q2 and Q4 having the same distance are present, the main unit side microcomputer 34 determines in step S405 whether there is any region whose distance is unknown among the regions Q1, Q2, Q3, and Q4. When it is determined that there is a region whose distance is unknown, the main unit side microcomputer 34 finds the average of the distances of the regions Q1, Q2, Q3, and Q4, and determines the average distance as the distance of the unknown region.

If detecting, for example, the regions Q1, Q2, and Q4 respectively surrounded by the line locations L1, L2, L3, and L4, the main unit side microcomputer 34 detects outward from the center of the live view image. For example, the main unit side microcomputer 34 detects the regions Q2 and Q4 or Q4 and Q2, and then detects the region Q1.

In step S406, the main unit side microcomputer 34 determines whether there is any region which has the same distance and which is surrounded by the outer edge of the live view image LV. For example, FIG. 24 shows the region Q3 surrounded by the line location L3 and the outer edge of the live view image LV.

Having detected the region Q3 surrounded by the line location L3 and the outer edge of the live view image LV, the main unit side microcomputer 34 determines in step S407 whether there is any part whose distance is unknown in the region Q3. For example, it may be difficult to determine the distance of the part around the outer edge of the live view image LV. The main unit side microcomputer 34 finds the average of pieces of distance information in the region Q3, and determines the average distance as the distance of the part whose distance is difficult to determine.

Even if the pieces of distance information are different, the main unit side microcomputer 34, in step S408, detects the line location where the pieces of distance information are linearly arranged on the surface of the live view image LV. The line location where the pieces of distance information are different and linearly arranged is, for example, each of borders L10 to L13 between the ceiling and the wall of the room as shown in FIG. 25. At the borders L10 to L13, the pieces of distance information sequentially become longer or shorter, and are linearly arranged. More specifically, the distance increases from the main apparatus 1 to the far side of the room at each of the borders L10 to L13, and the pieces of distance information acquired by the distance measurement sensors 30s are linearly arranged.

If, for example, the human shape H exists closer to the main apparatus 1 than the position of each of the borders L10 to L13 between the ceiling and the wall of the room on the live view image LV in the main apparatus 1, each of the borders L10 to L13 is cut by the human shape H. In this case, the main unit side microcomputer 34, in step S409, estimates that each of the borders L10 to L13 cut by the human shape H exists in the rear of the human shape H.

In step S410, the main unit side microcomputer 34 determines whether each of the borders L10 to L13 crosses, for example, the outer edge of the live view image LV. This crossing is determined in the direction of each of the borders L10 to L13 and the direction of the outer edge of the live view image LV. As a result, the main unit side microcomputer 34 determines that, for example, each of the borders L12 and L13 crosses the outer edge of the live view image LV. The main unit side microcomputer 34 also determines that, for example, each of the borders L10 and L11 crosses at the corner of the live view image LV. Thus, the main unit side microcomputer 34 estimates that each of the borders L12 and L13 linearly continues to the outside of the outer edge of the live view image LV, that is, to the outside of the live view image LV as shown in FIG. 25.

In step S411, the main unit side microcomputer 34 determines whether there is any location where pieces of linearly arranged distance information face each other and where the changes of the distance information are similar. That is, if the main unit side microcomputer 34 detects, for example, two line parts, the main unit side microcomputer 34 determines whether the directions of these line parts are symmetrical in the lateral or longitudinal direction of the live view image LV and whether the distances of the line parts sequentially become longer or shorter.

FIG. 26 shows a location where pieces of linearly arranged distance information face each other and where the changes of the distance information are similar. Each of the borders L10 and L12 exist between the ceiling and each wall surface. Each of the borders L11 and L13 exist between each wall surface and the floor. Each of the borders L10, L11, L12, and L13 is a location where the distance information, which increases or decreases in distance at a constant rate of change, is linearly arranged.

Regarding the borders L10, L11, L12, and L13, the main unit side microcomputer 34 determines that the borders L10 and L12 face each other, the borders L11 and L13 face each other, the borders L10 and L11 face each other, and the borders L12 and L13 face each other.

The main unit side microcomputer 34 detects, for example, each of the surfaces intervening between the borders L10 and L11 and the borders L11 and L13, and acquires surface information regarding each of the surfaces from each piece of distance information in the surfaces. The surface information comprises each piece of distance information and the coordinates of the distance information.

Figure 27:
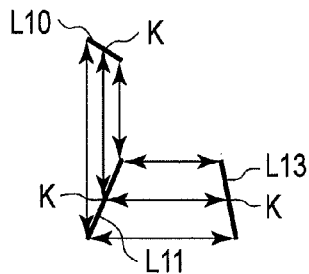
FIG. 27 is a diagram showing the function to cause a region whose distance information is unknown to have the same distance information at the location in a plane between boundaries detected by the same apparatus.

In step S412, the main unit side microcomputer 34 determines, as K, the locations where the distance information is the same at the borders L10, L11, L12, and L13 facing each other, as shown in FIG. 27. There are locations K having the same distance on the borders L10, L11, L12, and L13. In FIG. 27, only one location K is shown to avoid complexity.

The main unit side microcomputer 34 connects the locations K having the same distance with straight lines between the borders L10 and L11 and the borders L11 and L13. The main unit side microcomputer 34 provides the region whose distance information is unknown with the same distance information as the location K in each of the planes between the borders L10 and L11 and between the borders L11 and L13 connected with the straight lines.

The distance information regarding the region whose distance information is unknown is estimated by the above interpolation processing (step S304). If the image processing is changed for each of the regions estimated from the distance information as above, the stroboscopic predictive image by the application of stroboscopic light can be generated. The distance information for each region is obtained by detecting the surface surrounded by in-screen coordinates having distance information as described above. Regarding the region information, a face in the image data may be detected, and the region including this face may be detected as a particular region. The distance relative to the subject may be estimated from the far-and-near relationship of pieces of region information for each piece of region information in the three-dimensional space where photography is performed, and the kind of the image processing may be changed for each piece of region information.

Figure 28:
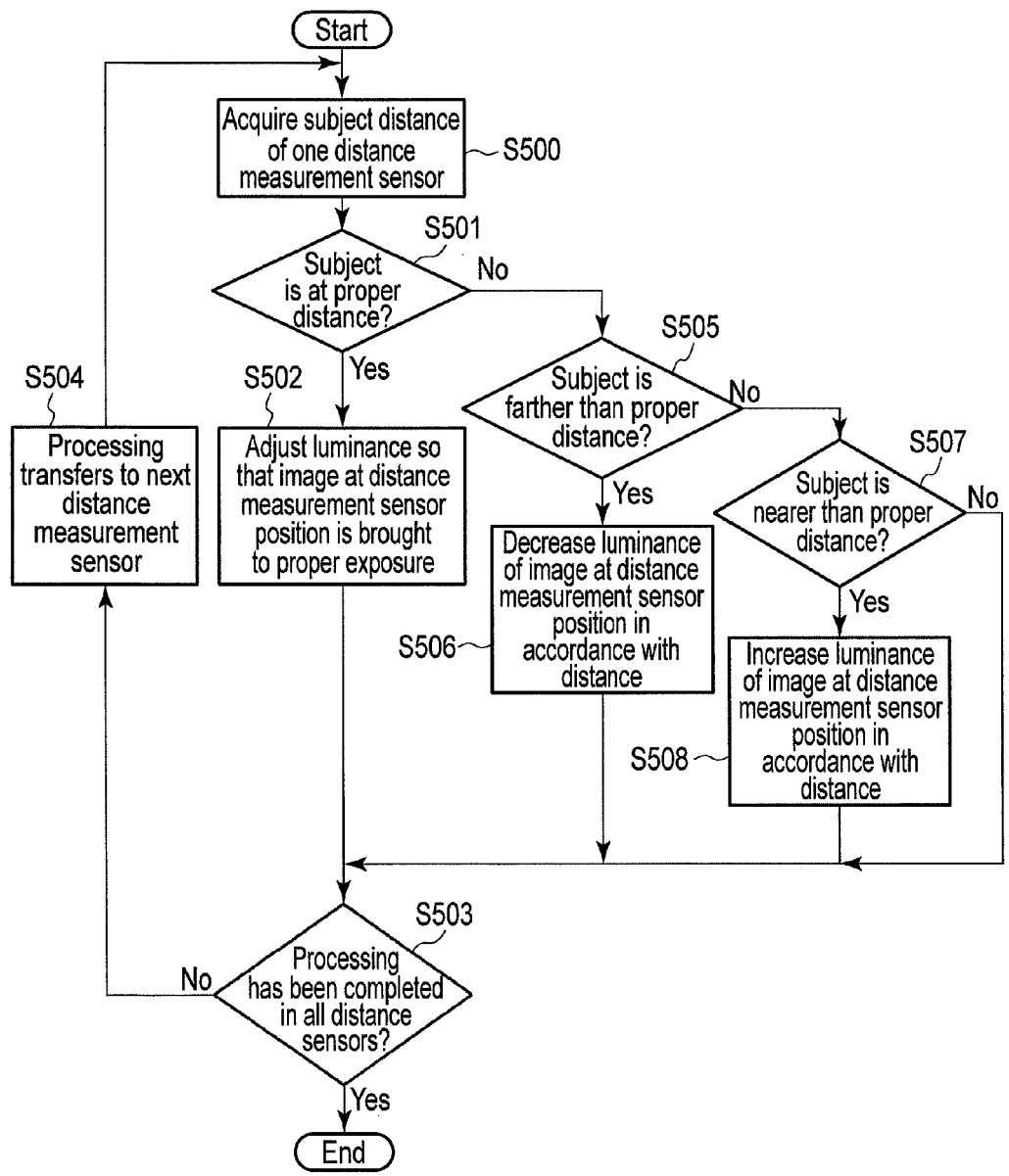
FIG. 28 is an image processing flowchart in the same apparatus.

Next, the image processing (step S313) is described in accordance with an image processing flowchart shown in FIG. 28.

In step S500, the image processing unit 35 acquires one of pieces of distance information relative to the subject acquired by the distance measurement sensors 30s.

In step S501, the image processing unit 35 determines whether the distance from one piece of distance information acquired by the distance measurement sensors 30s to the subject is proper. For example, the proper distance may be preset or may be set to a desired distance by the user every time photography takes place.

If it is determined that the distance to the subject is proper, the image processing unit 35, in step S502, adjusts the luminance so that the luminance of the image corresponding to the location of the distance measurement sensors 30s which has acquired the one piece of distance information will be brought to proper exposure.

In step S503, the image processing unit 35 determines whether the adjustment of the luminance of the images corresponding to the locations of all the distance measurement sensors 30s to proper exposure has been completed.

When it is determined that the adjustment of the luminance of the images corresponding to the locations of all the distance measurement sensors 30s to proper exposure has not been completed, the image processing unit 35, in step S504, proceeds to the adjustment to proper exposure for the next distance measurement sensor 30s, and shifts to step S500.

If the image processing unit 35 determines in step S501 that the distance to the subject is not proper, the image processing unit 35 determines in step S505 whether the distance from the one piece of distance information acquired by the distance measurement sensors 30s to the subject is greater than the proper distance.

If it is determined that the distance to the subject is greater than the proper distance, the image processing unit 35, in step S506, adjusts the luminance so that the luminance of the image corresponding to the location of the distance measurement sensors 30s, which has acquired the one piece of distance information, will be brought to exposure decreased by a predetermined luminance value. At the same time, the image processing unit 35 takes advantage of the far-and-near relationship and outline information to also perform similar processing for the region whose distance is unknown.

If it is determined that the distance from one piece of distance information acquired by the distance measurement sensors 30s to the subject is not greater than the proper distance, the image processing unit 35 determines in step S507 whether the distance from one piece of distance information acquired by the distance measurement sensors 30s to the subject is smaller than the proper distance.

If it is determined that the distance to the subject is smaller than the proper distance, the image processing unit 35, in step S508, adjusts the luminance so that the luminance of the image corresponding to the location of the distance measurement sensors 30s, which has acquired the one piece of distance information, will be increased by a predetermined luminance value so as to expose the subject.

Thus, according to the fourth embodiment described above, each piece of distance information to the subject is acquired from each of the distance measurement signals output from the distance measurement sensors 30s. If distance information is not acquired from all the distance measurement signals, the interpolation processing is performed to estimate the distance information which cannot be acquired. If the guide number is not set, a provisional guide number is set. If the finger of the user touches the touch panel 48 on the screen of the display unit 47, the brightness of the desired region in the live view image including the touch coordinates is adjusted to proper brightness. If, for example, the distance to the subject is proper, a luminance adjustment is made so that the luminance of the image will be brought to proper exposure. If the distance to the subject is greater than the proper distance, a luminance adjustment is made to decrease the luminance of the image by a predetermined luminance value. If the distance to the subject is close, a luminance adjustment is made to increase the luminance of the image by a predetermined luminance value. Consequently, as in the previously described first embodiment, it is possible to predict and display an accurate flash image in advance of stroboscopic photography, and precisely assist the stroboscopic photography.

If there is a region whose distance information is not acquired in the subject, distance information regarding this region is acquired by interpolating already acquired distance information. Therefore, it is possible to create a stroboscopic predictive image which has been changed in brightness in accordance with the interpolated distance distribution information, and to increase the accuracy of the stroboscopic predictive image.

It should be understood that the concept of region division of the subject part based on the above-described spatial perception by distance distribution is not only applicable to consumer-oriented cameras, but also applicable to medical observation equipment and industrial inspection equipment. It is possible to predict or simulate an observation image during light projection by analogizing the far-and-near relationship.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photographic apparatus comprising:
   an image pickup device which photographs a subject and then outputs an image signal;
   a stroboscope which applies stroboscopic light to the subject together with the photography by the image pickup device;
   a stroboscopic image prediction creation unit which acquires distance distribution information showing the distribution of distance information relative to the subject of the photography of the subject together with the application of the stroboscopic light, and predicts in advance, on the basis of the distance distribution information, a stroboscopic image for the photography of the subject together with the application of the stroboscopic light; and
   a display which displays the stroboscopic image, wherein the stroboscopic image prediction creation unit changes a brightness of the stroboscopic image in accordance with the distance information relative to the subject conforming to the distance distribution information.

2. The photographic apparatus according to claim 1, wherein,
   the stroboscopic image prediction creation unit divides the subject into pieces of region information in accordance with the distribution of the distance information, and creates the stroboscopic image on the basis of the pieces of region information.

3. The photographic apparatus according to claim 2, wherein,
   the stroboscopic image prediction creation unit changes image processing for each the piece of region information to create the stroboscopic image.

4. The photographic apparatus according to claim 2, wherein,
   the stroboscopic image prediction creation unit includes coordinate points having the distance information, and provides the coordinate points onto the subject in accordance with the distance information, and acquires, as the region information, a region surrounded by the coordinate points.

5. The photographic apparatus according to claim 2, further comprising:
   an image processor which performs image processing for the image signal output from the image pickup device to acquire image data including the subject, and which detects a face from the image data including the subject, wherein
   the stroboscopic image prediction creation unit determines a particular region on the basis of the detection result of the face by the face detection unit.

6. The photographic apparatus according to claim 2, wherein,
   the photography is performed in a space where the subject is present, and
   the stroboscopic image prediction creation unit estimates the far-and-near relationship of the pieces of region information on the basis of the distance information corresponding to the region information, estimates the far-and-near relationship to the subject in the space of the photography from the far-and-near relationship of the pieces of region information, and determines a particular region on the basis of the result of the estimation of the distance.

7. The photographic apparatus according to claim 1, wherein,
   the display includes a touch panel,
   the photographic apparatus further comprising an image adjusting unit adjusts the brightness of a desired region to proper brightness if the desired region in the stroboscopic image displayed on the display by a touch on the touch panel is indicated.

8. The photographic apparatus according to claim 1, further comprising:
   distance sensors detects the distance information relative to the subject,
   wherein the stroboscopic image prediction creation unit acquires the distance information detected by the distance sensors, and when an information-unacquired region in which the distance information is not acquired for the subject is present, the stroboscopic image prediction creation unit acquires distance information regarding the information-unacquired region by interpolation processing based on the distance information acquired in a region other than the information-unacquired region.

9. A photographic apparatus comprising:
   an image pickup device which photographs a subject and then outputs an image signal;
   a stroboscope which applies stroboscopic light to the subject together with the photography by the image pickup device;
   a stroboscopic image prediction creation unit which acquires distance distribution information showing the distribution of distance information relative to the subject of the photography of the subject together with the application of the stroboscopic light, and predicts in advance, on the basis of the distance distribution information, a stroboscopic image for the photography of the subject together with the application of the stroboscopic light; and
   a display which displays the stroboscopic image; and
   distance sensors detects the distance information relative to the subject, wherein
   the stroboscopic image prediction creation unit acquires the distance information detected by the distance sensors, and when an information-unacquired region in which the distance information is not acquired for the subject is present, the stroboscopic image prediction creation unit acquires distance information regarding the information-unacquired region by interpolation processing based on the distance information acquired in a region other than the information-unacquired region, and the stroboscopic image prediction creation unit acquires the distance distribution information by the distance information detected by the distance sensors and the distance information detected by the interpolation processing, and creates the stroboscopic image which has been changed in brightness in accordance with the distance information relative to the subject conforming to the distance distribution information.

10. A stroboscopic image prediction method comprising:

acquiring distance distribution information showing the distribution of distance information relative to a subject of photography of the subject together with the application of stroboscopic light; and predicting in advance, on the basis of the distance distribution information, a stroboscopic image for the photography of the subject together with the application of the stroboscopic light; and displaying the predicted stroboscopic image on a display, and changing a brightness of the stroboscopic image in accordance with the distance information relative to the subject conforming to the distance distribution information.

11. The stroboscopic image prediction method according to claim 10, wherein, in the prediction of the stroboscopic image, the subject is divided into pieces of region information in accordance with the distribution of the distance information, and the stroboscopic image is created on the basis of the pieces of region information.

12. A photographic apparatus comprising:

an image pickup device which photographs a subject and then outputs an image signal;

a stroboscope which applies stroboscopic light to the subject together with the photography by the image pickup device;

a microcomputer having a memory for storing computer executable instructions to acquire distance distribution information showing the distribution of distance information relative to the subject of the photography of the subject together with the application of the stroboscopic light, and predict in advance, on the basis of the distance distribution information, a stroboscopic image for the photography of the subject together with the application of the stroboscopic light; and a display which displays the stroboscopic image, wherein the microcomputer provides computer executable instructions to change a brightness of the stroboscopic image in accordance with the distance information relative to the subject conforming to the distance distribution information.

* * * * *